US008358342B2

(12) United States Patent
Park

(10) Patent No.: US 8,358,342 B2
(45) Date of Patent: Jan. 22, 2013

(54) VIDEO PROCESSING SYSTEMS AND METHODS

(75) Inventor: Youngchoon Park, Brookfield, WI (US)

(73) Assignee: Johnson Controls Technology Company, Holland, MI (US)

( * ) Notice: Subject to any disclaimer, the term of this patent is extended or adjusted under 35 U.S.C. 154(b) by 1339 days.

(21) Appl. No.: 12/036,053

(22) Filed: Feb. 22, 2008

(65) Prior Publication Data
US 2008/0252723 A1 Oct. 16, 2008

Related U.S. Application Data

(60) Provisional application No. 60/903,219, filed on Feb. 23, 2007.

(51) Int. Cl.
H04N 7/18 (2006.01)
(52) U.S. Cl. ........................................ 348/143; 348/136
(58) Field of Classification Search .................. 348/136, 348/143
See application file for complete search history.

(56) References Cited

U.S. PATENT DOCUMENTS

| 6,046,745 | A | 4/2000 | Moriya et al. | |
| 6,794,987 | B2 | 9/2004 | Schiffmann et al. | |
| 2001/0010540 | A1* | 8/2001 | Ogura et al. | 348/136 |
| 2002/0141635 | A1* | 10/2002 | Swift et al. | 382/154 |
| 2002/0163576 | A1* | 11/2002 | Ishino et al. | 348/136 |
| 2006/0132487 | A1* | 6/2006 | Sada et al. | 345/427 |
| 2006/0242419 | A1* | 10/2006 | Gaffey et al. | 713/176 |
| 2007/0146389 | A1* | 6/2007 | Distler | 345/629 |
| 2007/0206204 | A1* | 9/2007 | Jia et al. | 356/604 |

FOREIGN PATENT DOCUMENTS
WO WO2008/103929 A2 8/2008

OTHER PUBLICATIONS

Grammatikopoulos, et al., "Automatic estimation of vehicle speed from uncalibrated video sequences" Nov. 3, 2005, Proc. International Symposium on Modern Technologies, Education and Professional Practice in Geodesy and Related Fields, pp. 332-338.*
Chastain, Sue, "Setting the grid for perspective correction in Paint Shop Pro", May 16, 2006, p. 1.*
Mikic, et al., "Activity monitoring and summarization for an intelligent meeting room", Proceedings Workshop on Human Motion IEEE Comput., 2000, pp. 107-112.*
Chen et al., New Calibration-free Approach for Augmented Reality Based on Parameterized Cuboid Structure, Proceedings of the Seventh IEEE International Conference on Computer Vision, 1999, 10 pages, IEEE Computer Society, Danvers, Massachusetts, USA.
Duda et al., Pattern Classification and Scene Analysis, cover page and pp. 276-283 (total pp. 5).
Egenhofer et al., On the Equivalence of Topological Relations, International Journal of Geographical Information Systems, 1994, 21 pages, vol. 8, No. 6.

(Continued)

Primary Examiner — Firmin Backer
Assistant Examiner — Jonathan Bui
(74) Attorney, Agent, or Firm — Foley & Lardner LLP

(57) ABSTRACT

A system for processing video information obtained by a video camera based on a representative view from the camera. The system includes a processor a memory communicably connected to the processor. The memory includes computer code for determining a relative depth for at least two different regions of the representative view. The memory further includes computer code for estimating a scale factor for the different regions of the representative view. The memory yet further includes computer code for determining a unit size for the different regions, the unit size based on the estimated scale factor and the determined relative depth of the different regions.

11 Claims, 28 Drawing Sheets

OTHER PUBLICATIONS

Grammatikopoulos et al., Automatic Estimation of Vehicle Speed from Uncalibrated Video Sequences, International Symposium on Modern Technologies, Education and Professional Practice in Geodesy and Related Fields, 2005, pp. 332-338, Sofia, Bulgaria.

Guttman, A., R-Trees: A Dynamic Index Structure for Spatial Searching, Proceedings of Annual Meeting of ACM SIGMOD, 1984, 2 cover pages and pp. 47-57, vol. 14, No. 2, New York, New York, USA.

International Search Report and Written Opinion of International Application No. PCT/US2008/054762, mailed Sep. 10, 2008.

Mikic et al., Activity Monitoring and Summarization for an Intelligent Meeting Room, Computer Vision and Robotics Research Laboratory, Department of Electrical and Computer Engineering, University of California, 2000, 6 pages, IEEE, San Diego, California, USA.

Park et al., A Logical Framework for Visual Information Modeling and Management, Circuits Systems Signal Processing, 2001, 21 pages, vol. 20, No. 2.

Porikli, F., Road Extraction by Point-wise Gaussian Models, SPIE Algorithms and Technologies for Multispectral, Hyperspectral and Ultraspectral Imagery IX, 2003, 8 pages, vol. 5093, SPIE—The International Society for Optical Engineering.

Rodriguez, T., Practical Camera Calibration and Image Rectification in Monocular Road Traffic Applications, Machine Graphics and Vision International Journal, 2006, 23 pages, vol. 15, No. 1, The Institute of Computer Science, Polish Academy of Sciences, Ordona 21, Warzaw, Poland.

Rowley et al., Neural Network-Based Face Detection, IEEE Transactions on Pattern Analysis and Machine Intelligence, 1998, 16 pages, vol. 20, No. 1, IEEE.

Schneiderman et al., A Statistical Method for 3D Object Detection Applied to Faces and Cars, Proceedings of IEEE Conference on Computer Vision and Pattern Recognition, 2000, 7 pages, vol. I, IEEE, Pittsburgh, Pennsylvania, USA.

Schoepflin et al., Algorithms for Estimating mean Vehicle Speed Using Uncalibrated Traffic Management Cameras, WSDOT Research Report, Oct. 2003, 10 pages, retrieved from the Internet: URL:http://www.wsdot.wa.gov/research/reports/fullreports/575.1.

Simard et al., Boxlets: A Fast Convolution Algorithm for Signal Processing and Neural Networks, Advances in Neural Information Processing Systems 11, 1998, 8 pages, The MIT Press, London, England.

Song et al., Polygon-Based Bounding Volume as a Spatio-Temporal Data Model for Video Content Access, Proceedings of SPIE, 2000, 2 cover pages and pp. 171-182, vol. 4210, Internet Multimedia Management Systems, Bellingham, Washington, USA.

Sturm et al., A Method for Interactive 3D Reconstruction of Piecewise Planar Objects from Single Images, British Machine Vision Conference, 1999, cover page and pp. 265-274, vol. 1, The University of Reading, Reading, United Kingdom.

Sturm et al., On Plane-Based Camera Calibration: A General Algorithm, Singularities, Applications, IEEE Computer Society Conference on Computer Vision and Pattern Recognition, 1999, 2 cover pages and pp. 232-237, vol. 1, The Printing House, USA.

Tekalp, A., Digital Video Processing, cover page and pp. 100-109, Prentice Hall PTR, Upper Saddle River, New Jersey, USA.

Viola et al., Robust Real-Time Face Detection, International Journal of Computer Vision, 2004, pp. 137-157, vol. 57, No. 2, Kluwer Academic Publishers, The Netherlands.

Wolberg, G., Digital Image Warping, IEEE Computer Society Press, 1990, pp. 47-75, Los Alamitos, California, USA.

Yang et al., A SNoW-Based Face Detector, Advances in Neural Information Processing Systems 12, 1999, 9 pages, The MIT Press, London, England.

Zhao, T., Tracking Multiple Humans in Complex Situations, IEEE Transactions on Pattern Analysis and Machine Intelligence, 2004, pp. 1208-1221, vol. 26, No. 9, IEEE Computer Society, Los Alamitos, California, USA.

U.S. Appl. No. 12/135,043, filed Jun. 6, 2008, Park.

Beymer et al., A Real-time Computer Vision System for Measuring Traffic Parameters, 1997, pp. 495-501, The Dept. of Electrical Engineering and Computer Sciences, University of California, Berkeley, California, USA.

Caprile et al., Using Vanishing Points for Camera Calibration, International Journal of Computer Vision, 1990, 2 cover pages and pp. 127-139, vol. 4, No. 2, Kluwer Academic Publishers, The Netherlands.

Casey, J., A Sequel to the First Six Books of the Elements of Euclid, Containing an Easy Introduction to Modern Geometry with Numerous Examples, 1888, 3 pages, $5^{th}$ edition, Dublin: Hodges, Figgis, & Co., London, UK.

Chastain, S., Setting the Grid for Perspective Correction in Paint Shop Pro, URL:http://web.archive.org/web/20060516110012/http://graphicssoft.about.com/od/paintshoppro/ss/straighten_7.htm, 2006,1 page, About, Inc., New York, USA.

* cited by examiner

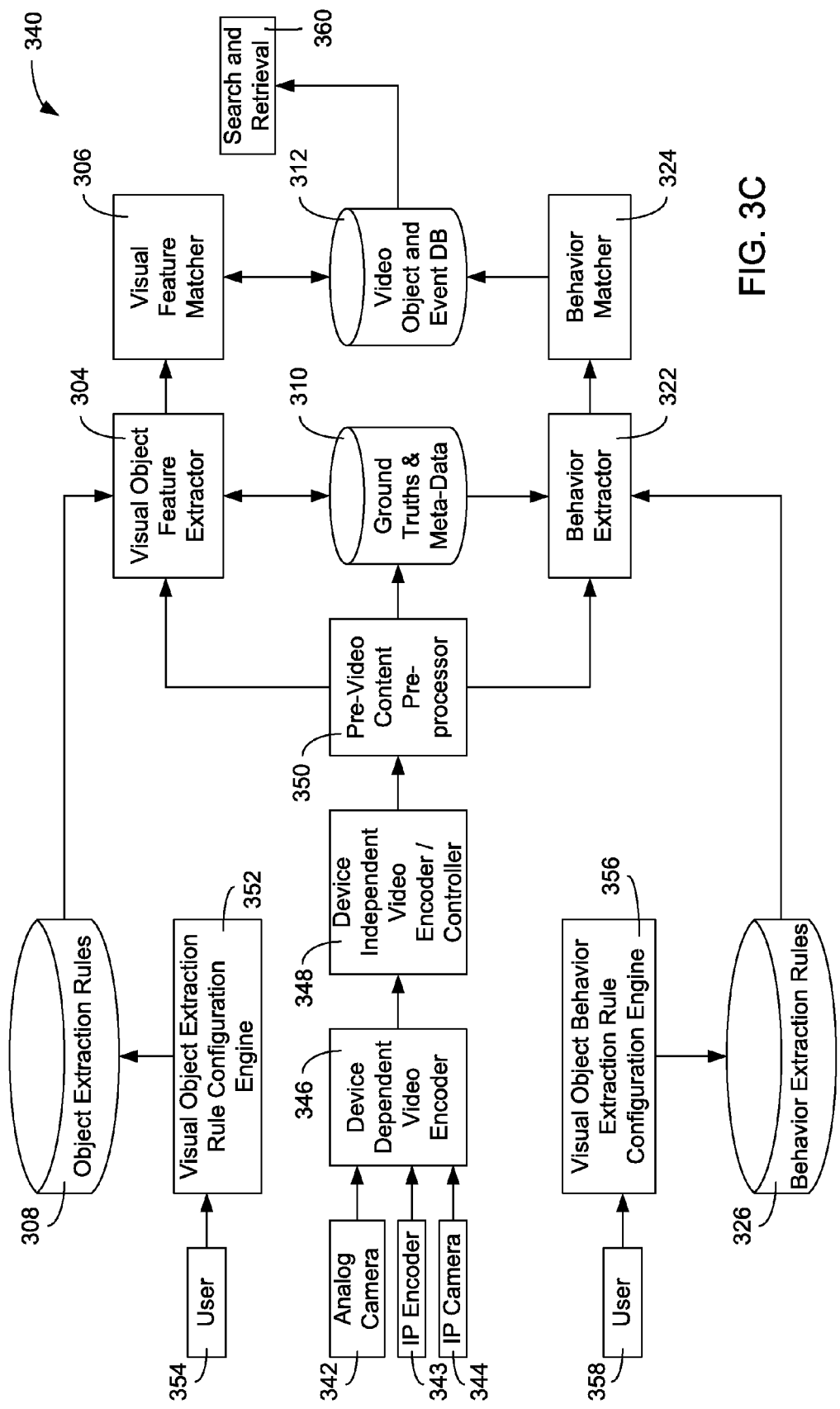

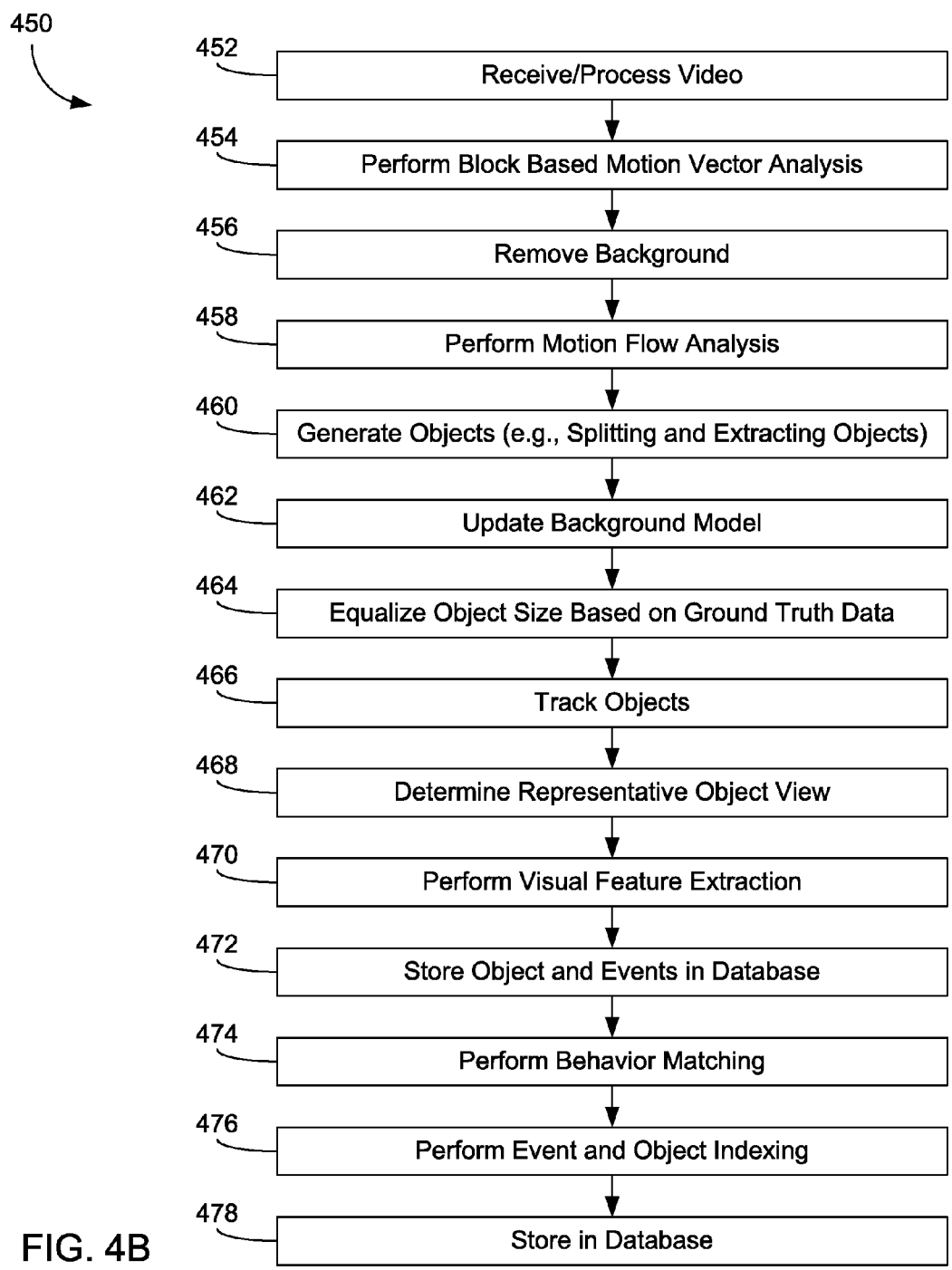

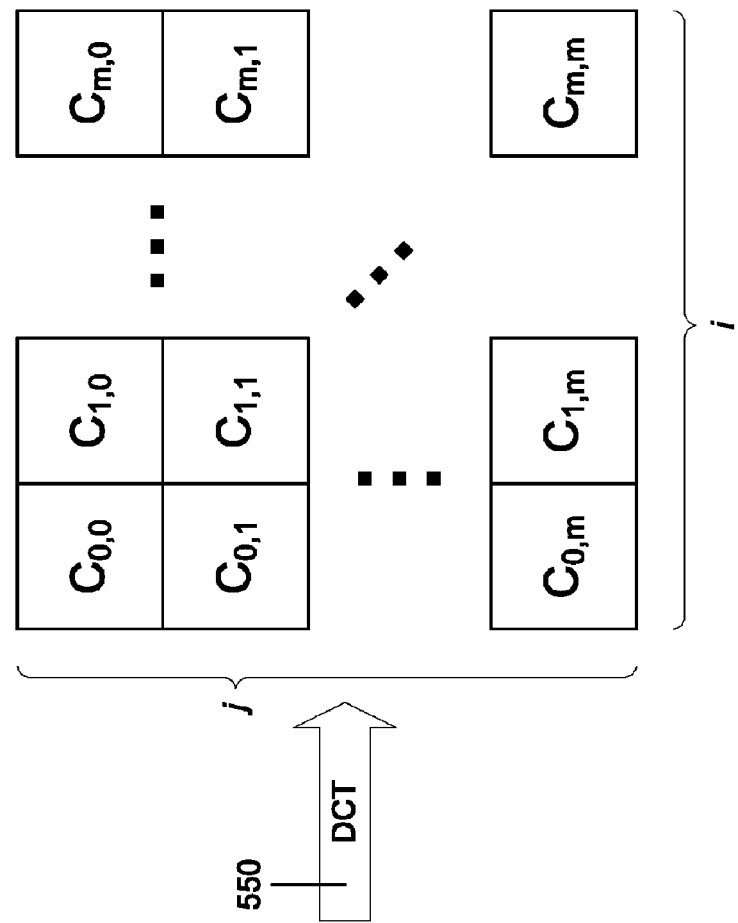
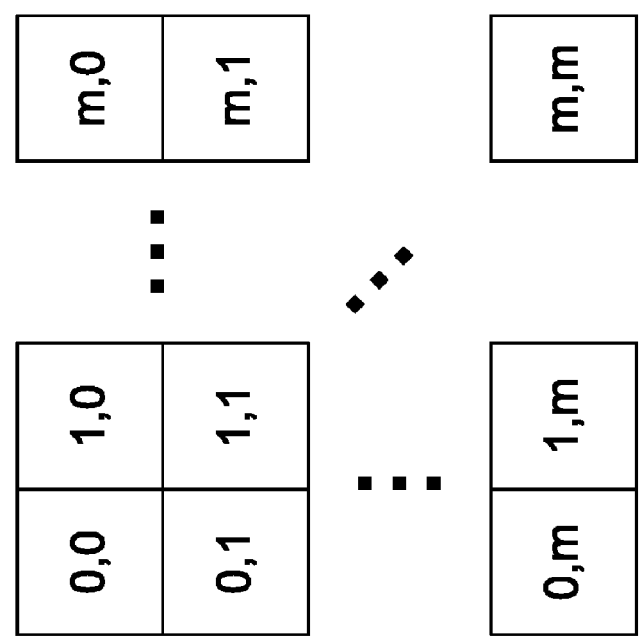
FIG. 5B

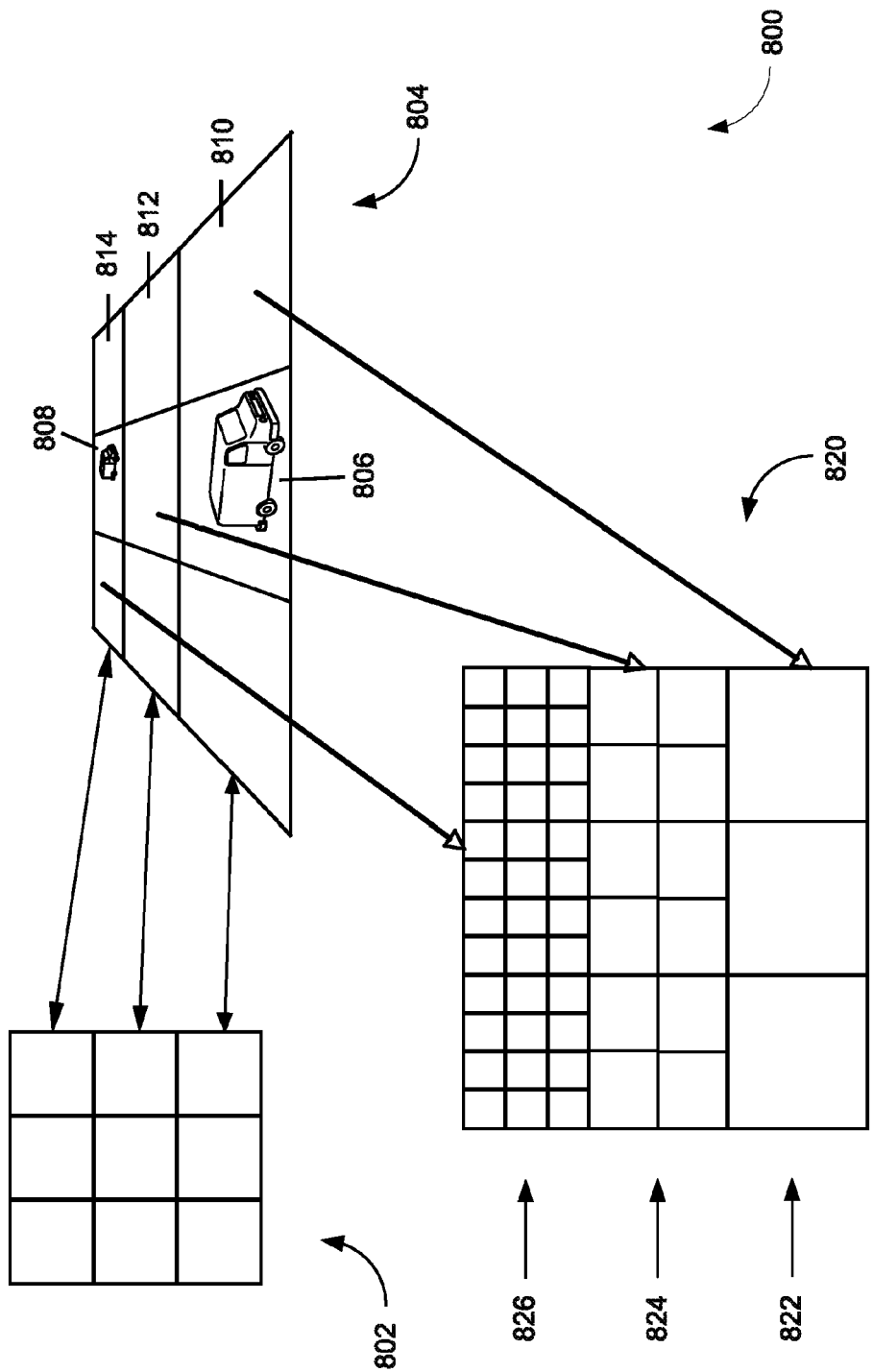

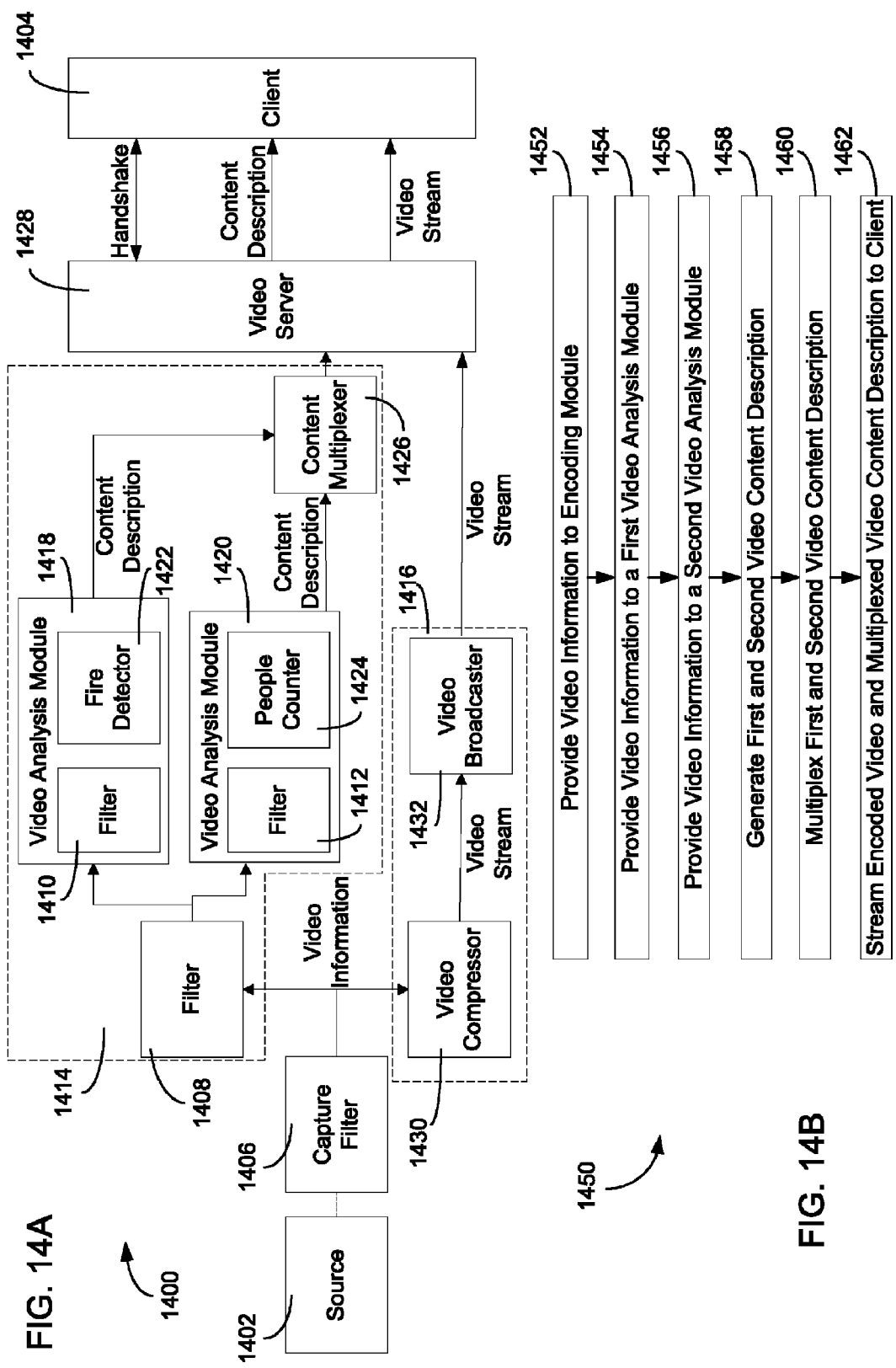

VIDEO PROCESSING SYSTEMS AND METHODS

CROSS-REFERENCE TO RELATED APPLICATIONS

The present application claims the benefit of U.S. Provisional Patent Application No. 60/903,219 filed Feb. 23, 2007, the entire disclosure of which is incorporated by reference.

BACKGROUND

The present disclosure relates generally to the field of video processing. More specifically, the present disclosure relates generally to the field of video surveillance processing, video storage, and video retrieval.

Conventional video systems display or record analog or digital video. In the context of surveillance systems, the video is often monitored by security personnel and/or recorded for future retrieval and playback. Typical recording systems often store large segments of video data using relatively simple descriptors. For example, a video recording system may include a camera number and date/time stamp with a recorded video segment, such as "Camera #4—Feb. 14, 2005-7:00 p.m.-9:00 p.m." Even if the video recording system stores the video in a database or as a computer file, the video recording system may store little more than the basic information. While these systems may create and store a vast amount of video content, conventional video systems are rather cumbersome to use in the sense that humans must typically search video by manually viewing and reviewing video from a specific camera over a specific time window.

Even when a video system conducts basic video analysis, this analysis is typically performed at a centralized and dedicated video processing system and may have requirements such as: a large amount of buffer memory to store intermediate processing results and captured video frames; high bandwidth for video data transmission from the capture device to memory; a high performance CPU; and complex processing and resource management (e.g., shared buffer management and thread management). In addition to the hardware challenges presented by conventional video analysis systems, traditional video systems have been developed on proprietary data exchange and information interface models. These models may include, for example, custom-built data structures with code-level tight binding, and may usually require expensive code-maintenance that may limit the extensibility of the system. Data exchange features that may exist within conventional video systems are typically limited in that the data exchange models are not well specified or defined. For example, many of the software components rely on traditional individual variables and custom built data structures to pass parameters and to conduct component messaging tasks. This traditional design limits the ability of third-party developers to provide valuable add-on devices, compatible devices, and/or software extensions. Furthermore, this traditional design creates a software engineering overhead such that consumers of conventional video systems may not be able to effectively modify video systems to meet their particular needs.

There is a need for distributed video content processing systems and methods. Further, there is a need for video description systems and methods capable of supporting a distributed video processing system. Further, there is a need for video content definition, indexing, and retrieval systems and methods. Further, there is a need for video processing systems capable of conducting detailed content analysis regardless of the video standard input to the system. Further, there is a need for video processing systems capable of indexing video surveillance data for content querying. Further, there is a need for video surveillance systems capable of querying by object motion. Further, there is a need for video processing systems capable of providing user preference-based content retrieval, content delivery, and content presentation. Further, there is a need for a graphical visual querying tool for surveillance data retrieval.

SUMMARY

The invention relates to a system for processing video information obtained by a video camera based on a representative view from the camera. The system includes a processor a memory communicably connected to the processor. The memory includes computer code for determining a relative depth for at least two different regions of the representative view. The memory further includes computer code for estimating a scale factor for the different regions of the representative view. The memory yet further includes computer code for determining a unit size for the different regions, the unit size based on the estimated scale factor and the determined relative depth of the different regions.

The invention also relates to a system for determining a tilt angle for a camera. The system includes a processor and memory communicably connected to the processor. The memory includes computer code for generating a graphical user interface configured to accept user input, the graphical user interface including an image obtained by the camera and a grid overlaying the image. The memory further includes computer code for using the input to allow the user to change the shape of the grid. The memory further includes computer code for determining the tilt angle for the camera based on the changes made to the grid.

The invention also relates to a system for processing video data obtained by a source. The system includes a processor and memory communicably coupled to the processor. The memory includes computer code for creating a description of the video data received from the source, wherein the description includes a definition of at least one object in the video data, wherein the object is detected from the video using a computerized process. The memory further includes computer code for providing the description to a subsequent processing module.

Alternative exemplary embodiments relate to other features and combinations of features as may be generally recited in the claims.

BRIEF DESCRIPTION OF THE FIGURES

The application will become more fully understood from the following detailed description, taken in conjunction with the accompanying figures, wherein like reference numerals refer to like elements, in which:

FIG. 3C is a block diagram of a video processing system, according to yet another exemplary embodiment;

FIG. 4A is a flow diagram of a method of estimating object properties, according to an exemplary embodiment;

FIG. 4B is a flow diagram of a video event and object detection method, according to an exemplary embodiment;

FIG. 5B illustrates a coding sequence of a Discrete Cosine Transform used in the method of FIG. 5A, according to an exemplary embodiment;

FIG. 8 illustrates concepts utilized in improving the performance of a video processing system, according to an exemplary embodiment;

FIG. 14A is a block diagram of a video processing system, according to an exemplary embodiment;

FIG. 14B is a flow diagram of a method for a distributed processing scheme, according to an exemplary embodiment;

DETAILED DESCRIPTION OF THE EXEMPLARY EMBODIMENTS

Before turning to the figures which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1A:
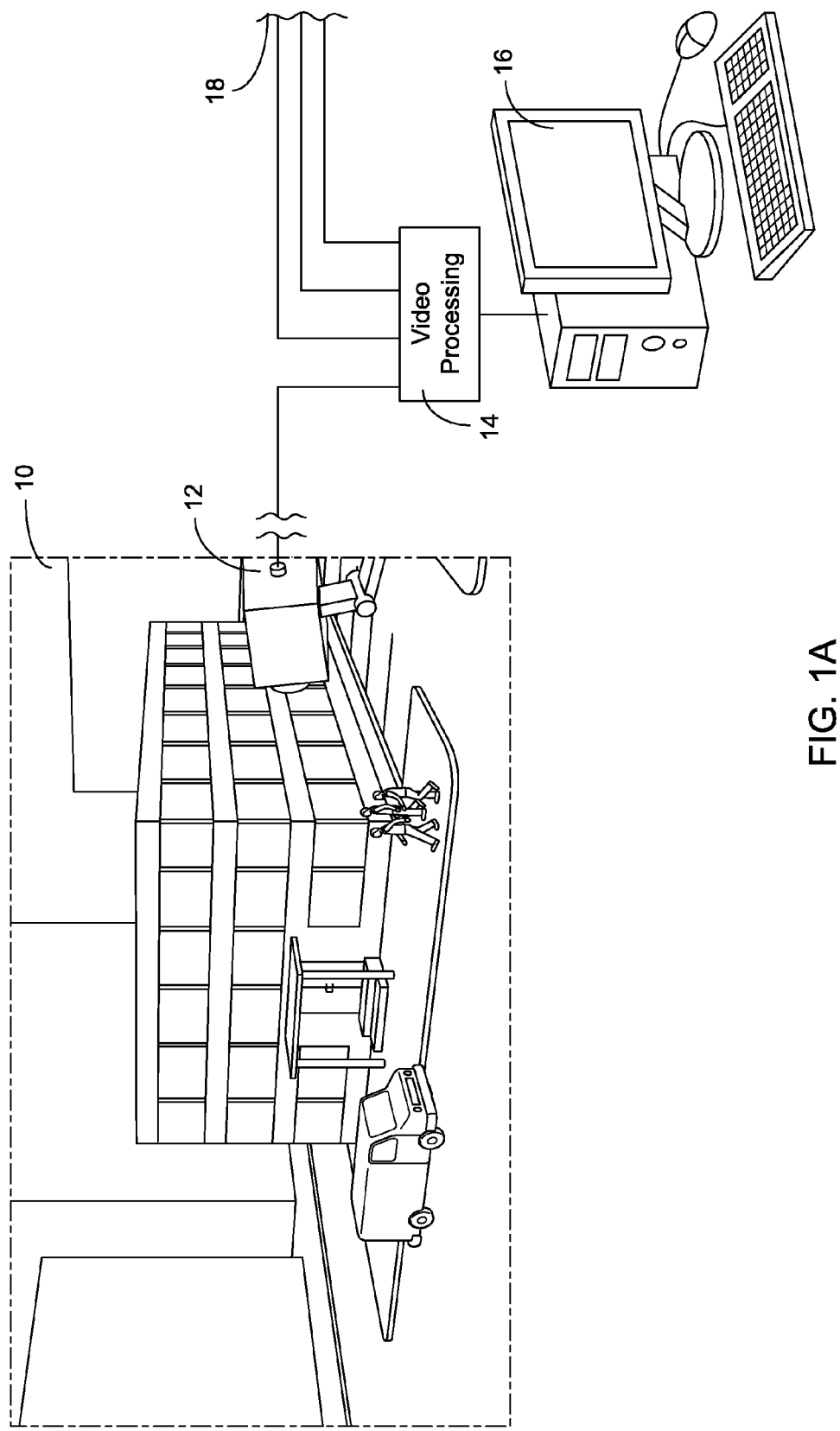
FIG. 1A is a perspective view of a building, video camera, video processing system, and client terminal, according to an exemplary embodiment.

Referring to FIG. 1A, a perspective view of a video camera 12, video processing system 14, and client terminal 16 is shown, according to an exemplary embodiment. Video camera 12 may be used for surveillance and security purposes, entertainment purposes, scientific purposes, or any other purpose. Video camera 12 may be an analog or digital camera and may contain varying levels of video storage and video processing capabilities. Video camera 12 is communicably coupled to video processing system 14. Video processing system 14 may receive input from a single camera 12 or a plurality of video cameras via inputs 18 and conduct a variety of processing tasks on data received from the video cameras. The communication connection between the video cameras and the video processing system 14 may be wired, wireless, analog, digital, internet protocol-based, or use any other suitable communications systems, methods, or protocols. Client terminals 16 may connect to video processing system 14 for, among other purposes, monitoring, searching, and retrieval purposes.

The environment 10 which video camera 12 is positioned to capture video from may be an indoor and/or outdoor area, and may include any number of persons, buildings, cars, spaces, zones, rooms, and/or any other object or area that may be either stationary or mobile.

Figure 1B:
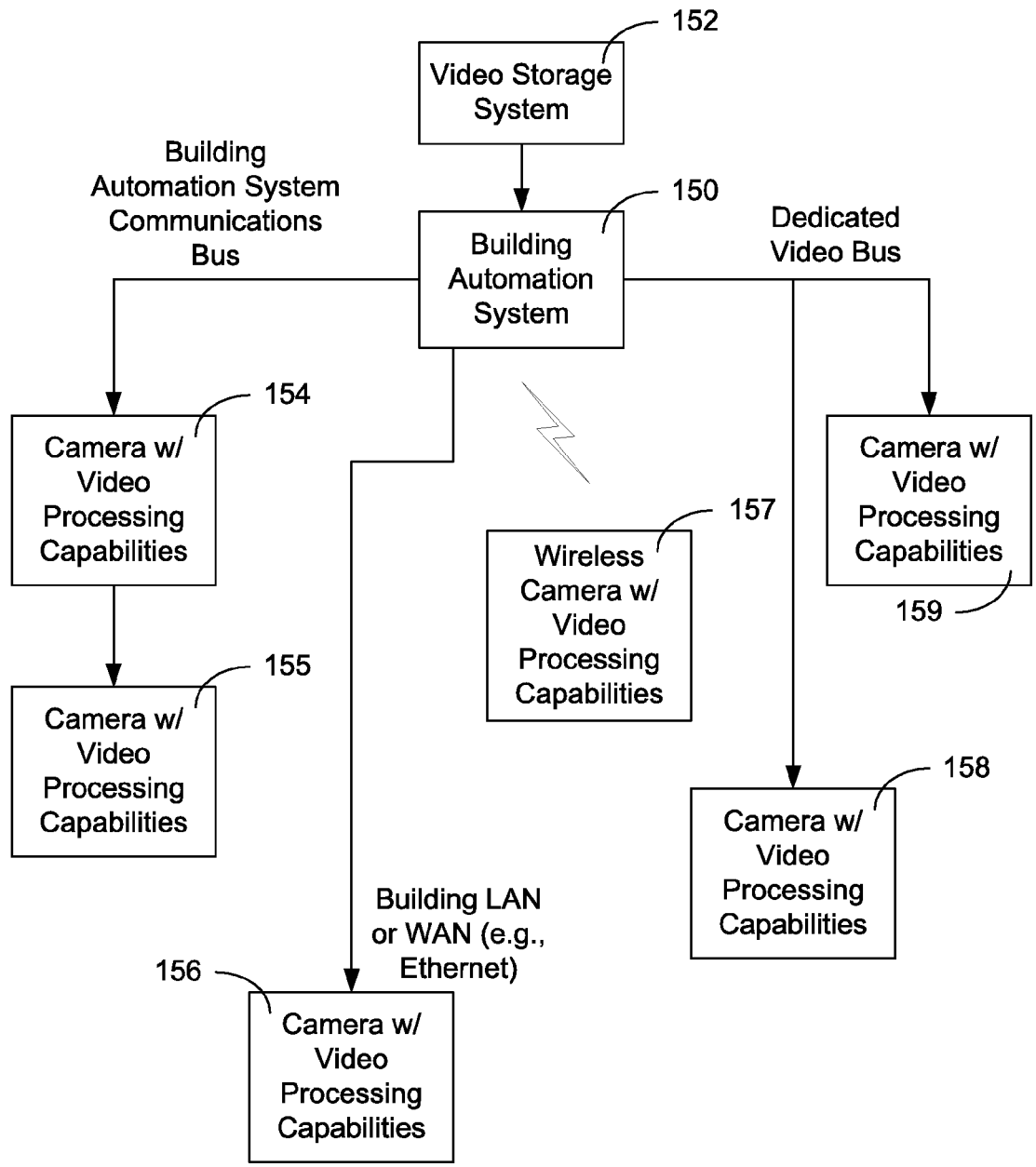
FIG. 1B is a block diagram of a building automation system coupled to various cameras with video processing capabilities, according to an exemplary embodiment.

Referring to FIG. 1B, a building automation system (BAS) 150 having video processing capabilities is shown, according to an exemplary embodiment.

A BAS is, in general, a hardware and/or software system configured to control, monitor, and manage equipment in or around a building or building area. The BAS as illustrated and discussed in the disclosure is an example of a system that may be used in conjunction with the systems and methods of the present disclosure; however, other building and/or security systems may be used as well. According to other exemplary embodiments, the systems and methods of the present disclosure may be used in conjunction with any type of system (e.g., a general purpose office local area network (LAN), a home LAN, a wide area network (WAN), a wireless hotspot, a home security system, an automotive system, a traffic monitoring system, an access control system, etc.).

BASs are often employed in buildings such as office buildings, schools, manufacturing facilities, and the like, for controlling the internal environment of the facility. BASs may be employed to control temperature, air flow, humidity, lighting, energy, boilers, chillers, power, security, fluid flow, and other systems related to the environment or operation of the building. Some BASs may include heating, ventilation, and/or air conditioning (HVAC) systems. HVAC systems commonly provide thermal comfort, acceptable air quality, ventilation, and controlled pressure relationships to building zones. BASs may include application and data servers, network automation engines, and a variety of wired and/or wireless infrastructure components (e.g., network wiring, wireless access points, gateways, expansion modules, etc.). Computer-based BASs may also include web-based interfaces and/or other graphical user interfaces that may be accessed remotely and/or queried by users.

Video processing may be done in a distributed fashion and the systems (communication systems, processing systems, etc.) of the BAS may be able to execute and/or support a distributed video processing system. For example, a BAS may be able to serve or otherwise provide a query interface for a video processing system. The data of the video surveillance system may be communicated through the various data buses or other communications facilities of the BAS.

Video processing software (e.g., central database management system software, web server software, querying software, interface software, etc.) may reside on various computing devices of BAS 150 (e.g., application and data server, web server, network automation engine, etc.). Cameras with video processing capabilities may be communicably connected to BAS 150. For example, cameras 154 and 155 are shown using a BAS communications bus, camera 156 is shown using a building LAN, WAN, Ethernet connection, etc., camera 157 is shown using a wireless connection, and cameras 158 and 159 are shown using a dedicated video bus. A supplemental video storage system 152 may be coupled to BAS 150. Other video processing devices may be distributed near the cameras and/or connected to BAS 150. Cameras 154-159 with video processing capabilities may have embedded processing hardware and/or software or may be cameras connected to distributed processing devices.

According to an exemplary embodiment, a BAS includes a plurality of video cameras communicably coupled to the BAS. The video cameras include video processing capabilities. The video processing capabilities include the ability to compress video and conduct object extraction. The BAS may further include a video content query interface. Video processing capabilities of the video cameras may further include the ability to describe the extracted objects using tree-based textual information structures. The BAS may further be configured to parse the tree-based textual information structures.

Video Processing Hardware Architecture

Figure 2A:
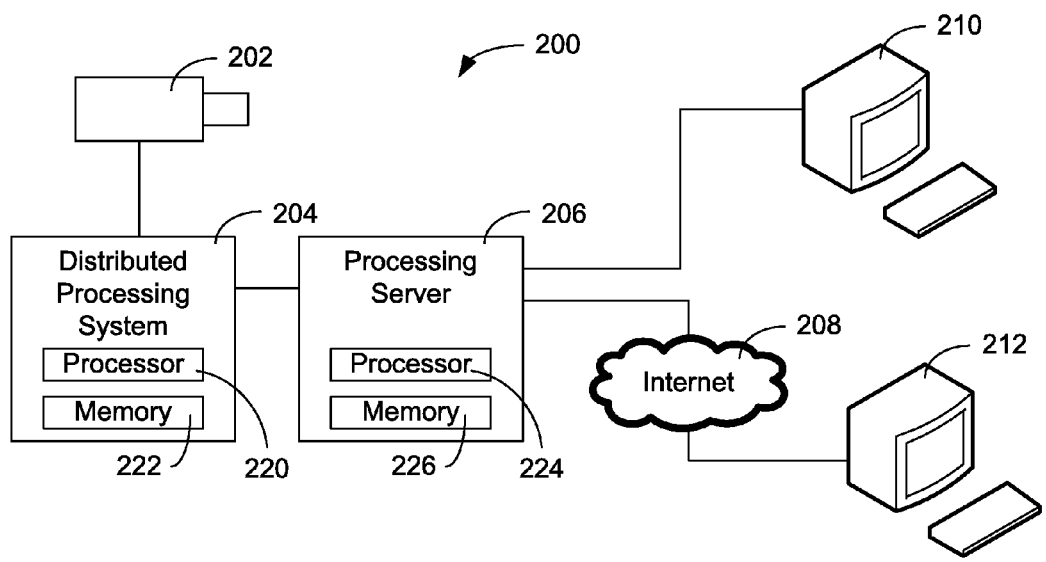
FIG. 2A is a block diagram of a video processing system, according to an exemplary embodiment.

Referring to FIG. 2A, a block diagram of a video processing system 200 is shown, according to an exemplary embodiment. A digital or analog camera 202 is shown communicably coupled to a distributed processing system 204. Distributed processing system 204 is shown communicably coupled to a central database and/or processing server 206. Terminals 210 and 212 are shown connected to central database and/or processing server 206. Terminals 210 and 212 may be connected to the server via a direct connection, wired connection, wireless connection, LAN, WAN, or by any other connection method. Terminals 210 and 212 may also be connected to the server via an Internet connection 208. System 204 may include a processor 220 and memory 222 and server 206 may include a processor 224 and memory 226.

Figure 2B:
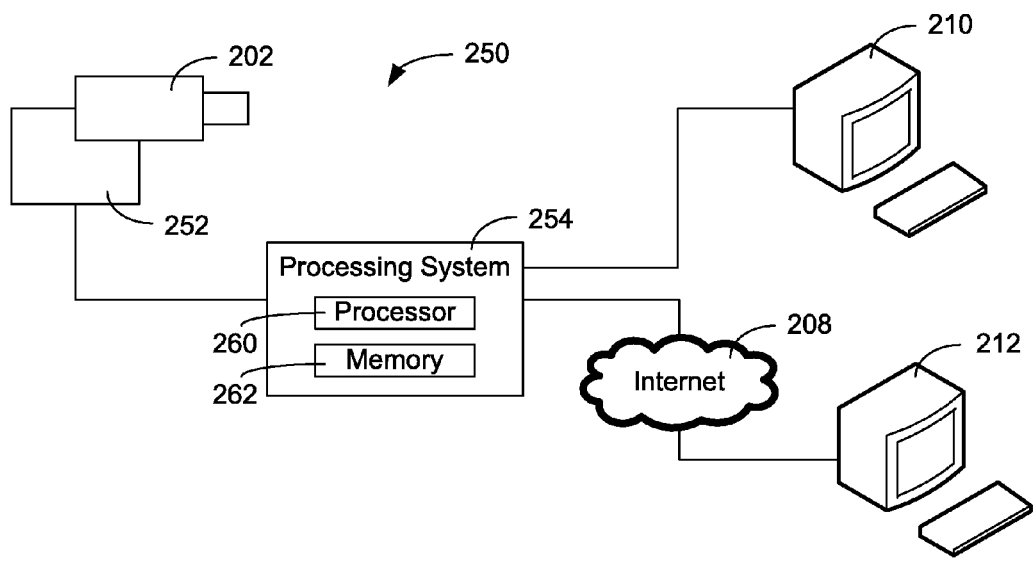
FIG. 2B is a block diagram of a video processing system, according to another exemplary embodiment.

Referring to FIG. 2B, a block diagram of a video processing system 250 is shown, according to another exemplary embodiment. Video processing system 250 may include a digital or analog video camera 202 communicably coupled to a processing system 254. System 254 may include a processor 260 and memory 262. Video camera 202 may include different levels of video processing capabilities ranging from having zero embedded processing capabilities (i.e., a camera that provides an unprocessed input to a processing system) to having a significant camera processing component 252. When a significant amount of video processing is conducted away from a central processing server, video processing system 254 may be called a distributed video processing system (e.g., distributed processing system 204 of FIG. 2A). According to various exemplary embodiments, the majority of the video processing is conducted in a distributed fashion and/or in the cameras. According to other exemplary embodiments, over eighty percent of the processing is conducted in a distributed fashion and/or in the cameras. Highly distributed video processing may allow video processing systems that scale to meet user needs without significantly upgrading a central server and/or network.

Referring further to FIGS. 2A and 2B, the processing systems are shown to include a processor and memory. The processor may be a general purpose processor, an application specific processor, a circuit containing processing components, a group of distributed processing components, a group of distributed computers configured for processing, etc. The processor may be any number of components for conducting data and/or signal processing of the past, present, or future. A processor may also be included in cameras 202. The memory may be one or more devices for storing data and/or computer code for completing and/or facilitating the various methods described in the present description. The memory may include volatile memory and/or non-volatile memory. The memory may include database components, object code components, script components, and/or any other type of information structure for supporting the various activities of the present description. According to an exemplary embodiment, any distributed and/or local memory device of the past, present, or future may be utilized with the systems and methods of this description. According to an exemplary embodiment the memory is communicably connected to the processor (e.g., via a circuit or any other wired, wireless, or network connection) and includes computer code for executing one or more processes described herein.

Object Detection and Extraction

Figure 3A:
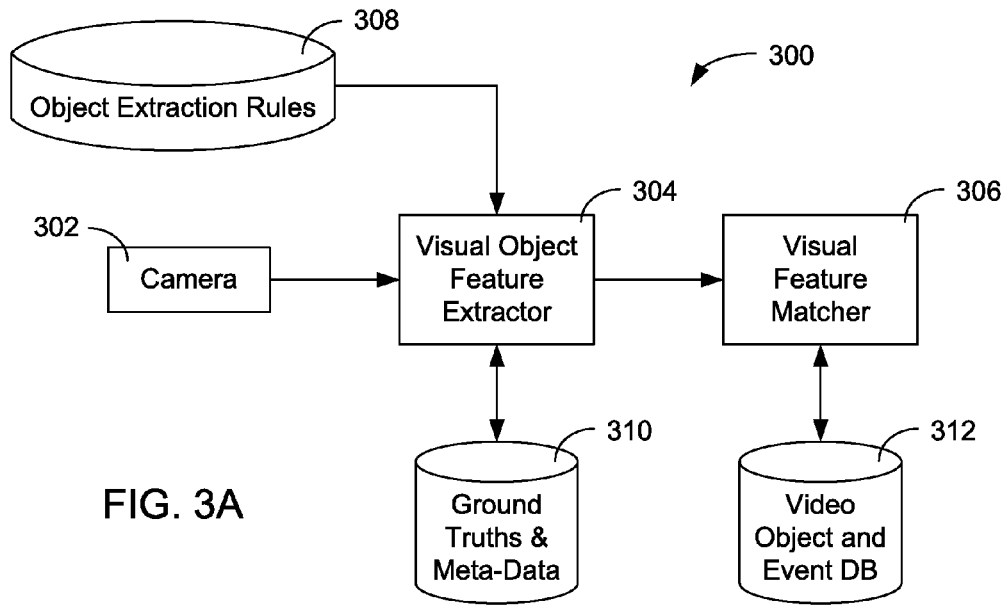
FIG. 3A is a block diagram of a video processing system, according to an exemplary embodiment.

Referring to FIG. 3A, a block diagram of a video processing system 300 is shown, according to an exemplary embodiment. Video may be streamed or passed from camera 302 to a visual object feature extractor 304. Visual object feature extractor 304 may conduct processing on video to extract objects of interest from the background of the video scene and assign attributes to the extracted objects. For example, extractor 304 may extract moving objects of a certain size from a relatively static background. The extraction process may produce a number of identified objects defined by bounding rectangles, other bounding shapes, another visual identification method, and/or identified by coordinates and/or pixel locations in memory. Extractor 304 may use one or more rules obtained from an object extraction rules database 308 to assist extractor 304 in detecting, processing, and describing objects. Various information structures may be defined to organize and store the extracted objects and/or data describing the extracted objects. Extractor 304 may use a description scheme stored in database 308 or another storage mechanism to describe the extracted objects. For example, a description scheme such as an XML-based description scheme may be used to describe the shape, size, borders, colors, moving direction, and/or any other determined object variables. A standardized description scheme such as an XML-based description scheme may facilitate interoperability with other systems and/or software modules by using a common and easily parsable representation format. According to various other exemplary embodiments, one or more propriety description schemes may be used to describe detected and extracted objects. Extractor 304 may be computer code, other software, and/or hardware for conducting its activities.

A ground truths and meta-data database 310 may be communicably coupled to visual object feature extractor 304, according to an exemplary embodiment. Data stored in database 310 may be or represent information regarding the background of a video scene or another environment of the video captured by camera 302 and may be used to assist processes, such as those of visual object feature extractor 304, in accurately extracting objects of interest from a background, uninteresting content, and/or an expected environment of a video. It should be noted that the background, content that is not of interest, and/or expected environment aspects of a video scene may be subtracted from the scene via one or more processes to speed up or assist the processing of the remaining objects.

Visual feature matcher 306 may receive input from extractor 304 regarding detected objects of the video and attributes associated with the objects. Visual feature matcher 306 may extract additional attributes from the objects received. Visual feature matcher 306 may also or alternatively determine a type or class for the object detected (e.g., "person", "vehicle", "tree", "building", etc.). Visual feature matcher 306 may be communicably coupled to video object and event database 312. Data stored in database 312 may represent object type information which may be used by visual feature matcher 306 to assign a type to an object. Additionally, visual feature matcher 306 may provide data regarding objects, attributes of the objects, and/or the type associated with the objects to database 312 for storage and/or future use.

Figure 3B:
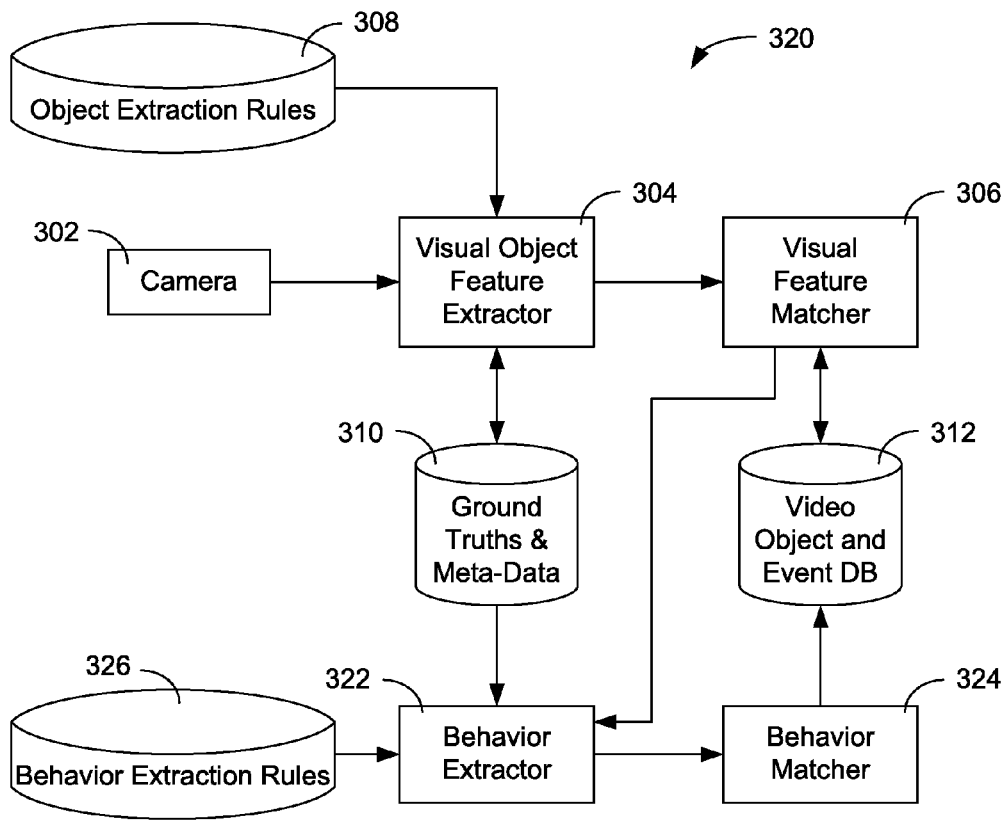
FIG. 3B is a block diagram of a video processing system, according to another exemplary embodiment.

Referring to FIG. 3B, a block diagram of a video processing system 320 is shown, according to another exemplary embodiment. System 320 includes the components described in system 300 of FIG. 3A. System 320 also includes various components relating to the behavior of objects detected in the provided video. Video processing system 320 may use a behavior extractor 322 to extract and/or describe object behavior attributes from video information, according to an exemplary embodiment. Behavior extractor 322 may receive an input from visual feature matcher 306 regarding the types and attributes of objects. Behavior extractor 322 may use a description scheme such as an XML description scheme to describe extracted object behavior. Behavior extractor 322 may draw upon behavior extraction rules database 326 to conduct its processes. Behavior extraction rules database 326 may contain data regarding types of behaviors, classes of behavior, filters for certain behavior, descriptors for behavior, and the like. Behavior extractor 322 may also draw upon and/or update ground truths and/or meta-data database 310 to improve behavior extraction and/or the behavior of other modules. Behavior extractor 322 may be computer code, other software, and/or hardware for conducting its activities.

After object features and object behaviors have been extracted, described, and/or stored, system 320 may attempt to match the resulting descriptions with known features or behaviors using behavior matcher 324. For example, a camera watching the front of a building may be able to match an object having certain features and behaviors with expected features and behaviors of a parked van. If behavior matcher 324 is able to match features and/or behaviors of extracted objects to some stored or expected features and behaviors, matcher 324 may further describe the object. Matcher 324 may also create an event record and store the resultant description or relation in video object and event database 312. The video processing system, client terminals, other processing modules, and/or users may search, retrieve, and/or update descriptions stored in database 312.

Behavior matcher 324 may include logic for matching behaviors to a specific event. An event may be a designated behavior that a user of the system may wish to extract and/or track. For example, "parking" may be one vehicle activity that may be desirable to be tracked, particularly in front of a building or non-parking zone. If the vehicle is "parked" for more than a specified period of time, behavior matcher 324 may determine that the behavior of the car being parked is an event (e.g., a suspicious event) and may classify the behavior as such. Behavior matcher 324 may be computer code, other software, and/or hardware for conducting its activities.

Referring to FIG. 3C, a block diagram of a video processing system 340 is shown, according to yet another exemplary embodiment. System 340 may include the various devices and components of systems 300 and 320 in addition to various configuration and pre-processing modules and/or devices. Various camera inputs (e.g., analog camera input 342, IP encoder input 343, IP camera input 344, a digital camera input, etc.) may be received at a device dependent video encoder 346. Device dependent video encoder 346 may accept standard and non-standard video input formats and convert or encode variously received video formats into a uniform video format that may be more easily used by system 340. Device dependent video encoder 346 may pass the encoded video to another video encoder (e.g., a device independent video encoder/controller 348) to further standardize, encode, or transform received video to a format that the rest of system 340 may easily handle and process. According to various other exemplary embodiments, device dependent video encoder 346 and/or device independent video encoder/controller 348 are not present and/or are combined into one encoder process. A pre-video content pre-processor 350 may provide some initial set-up, filtering, or processing on the video. Once video has been prepared for processing, the video may be streamed or passed to visual object feature extractor 304 and/or to other systems and components as generally described in FIGS. 3A, 3B, and throughout this description.

Behavior extraction rules may be stored in database 326 and may be configured (i.e., defined, added, updated, removed, etc.) by a visual object behavior extraction rule configuration engine 356 which may provide a user interface and receive input from users (e.g., user 358) of the system. Likewise, object extraction rules may be stored in database 308 and may be configured by a visual object extraction rule configuration engine 352 which may provide a user interface and receive input from users (e.g., user 354) of the system. Configuration engines 352 and 356 may be configured to generate graphical user interfaces for creating the rules used by object extractor 304 and behavior matcher 324. Configuration engines 352 and 356 may be or include a web page, a web service, and/or other computer code for generating user interfaces for accepting user input relating to the rules to be created. Configuration engines 352 and 356 may also include computer code for processing the user input, for creating the rules, and for storing the rules in databases 308 and 326.

Video object and event database 312 may be coupled to search and retrieval subsystem 360. Search and retrieval subsystem 360 is described in greater detail in FIG. 12.

Referring to FIG. 4A, a flow diagram of a method 400 for configuring a video processing system is shown, according to an exemplary embodiment. The camera is set up physically in a location (step 402). The camera may then record and provide scenes (e.g., an image, a representative image, a frames, a series of frames, etc.), to a user of the camera, a storage device, and/or a process for evaluating the scene (step 404). The scene may then be processed (step 406) for properties (e.g., size, distance, etc.) relating to the scene and/or the camera. This processing may generate, populate, and/or update data in a ground truth database. The ground truth database may store data, variables, camera characteristics, intermediate data, and/or any other information that the system may draw upon to conduct additional processing tasks. According to an exemplary embodiment, for example, the ground truths database contains information regarding what areas of a camera view are background areas, contrast values for the camera's view, meta-data for the camera's view (e.g., an indoor view, an outdoor view, a shared view, etc.), information regarding areas of known noise in view of the camera (e.g., moving trees), information regarding the depth of the scene, information regarding the scale of the scene, etc. According to various alternative embodiments, some video processing systems may not include and/or require the processing activity of FIG. 4A.

Referring to FIG. 4B, a flow diagram of a video event and object detection module or method 450 is shown, according to an exemplary embodiment. Video may be received and/or processed by method 450 (step 452). For example, video frames captured from a frame grabber, a networked video stream, a video encoder, and/or another suitable source may be supplied to a module of a video processing system (e.g., a device independent video encoding module configured to transcode or otherwise process the video frames into a device independent format).

The video analysis process then receives the video and the process is performed (step 454). An exemplary video analysis process for extracting objects from video is a block based motion vector analysis (BBMVA) process. An exemplary BBMVA process is described in greater detail in FIG. 5A. Video analysis process 454 may conduct any number of scene or video processing tasks immediately after receiving video but before beginning the video analysis process. For example, step 452 may include receiving a video and generating reconstructed frames to use in method 500 of FIG. 5A, the reconstructed frames including correction for depth, color, and/or other variables of, e.g., a ground truths database. A BBMVA process or other video analysis process may generally provide a motion map or motion data set describing the motion of objects extracted from the video.

Background may be removed from the video (step 456). Background removal may be used to identify video information that is not a part of the known background. Step 456 may include accessing a background model database to assist in the process. Background removal may also be used to speed the processing of the video and/or to compress the video information. Background removal may occur prior to, during, and/or after analysis 454.

If some objects are extracted from the video information in step 454, motion flow analysis (e.g., motion flow clustering) may be performed such that identified objects may be further extracted and refined (step 458). Motion flow analysis 458 may include clustering objects with like motion parameters (e.g., grouping objects with like motion vectors based on the directional similarity of the vectors). After a first pass or first type of motion flow analysis, it may be revealed, for example, that there are two dominant motion flows in an extracted object. Motion flow analysis 458 may determine, for example, with a degree of confidence, that a raw object extracted by step 454 is actually two temporarily "connected" smaller objects.

Objects may be generated (step 460) when detected by step 454 and/or after motion flow analysis. Step 460 may include the process of splitting objects from a raw object detected in step 454. For example, if motion flow analysis revealed that a single object may be two temporarily connected smaller objects, the object may be split into two sub-objects that will be separately analyzed, detected, tracked, and described. The objects generated in step 460 may be Binary Large Objects (Blobs), any other type of representative object for the detected objects, or any other description relating to groups of pixel information estimated to be a single object.

The background model for the background of the scene as viewed in the video may be updated (step 462). Step 462 may include updating a background model database (e.g., a ground truth database) that may be used in future iterations for step 454 of removing the background and/or in any other processing routine.

Object size of a desired object may be equalized based on scene information, camera information, and/or ground truth data stored in a ground truth database or otherwise known (step 464). The size of an object in video may be adjusted and/or transformed for ease of processing, data normalization, or otherwise.

Process 450 further includes tracking objects (step 466). The system may be configured to relate video objects appearing in multiple frames and use that determined relationship to automatically track and/or record the object's movement. If an object appears in multiple frames some views of an object may be better than others. The system may include logic for determining a representative view of such an object (step 468). The representative view may be used in further processing steps, stored, and/or provided to the user via a graphical user interface.

Steps 470-478 relate to managing one or more particular objects extracted from video information. It should be noted that the steps of method 450, and steps 470-478 in particular, may be conducted in parallel for multiple objects.

A visual feature extraction (e.g., block feature extraction) is performed on an object (step 470) to further refine a definition and/or other data relating to the object. The visual feature extraction may be performed by and have the general functionality of visual object feature extractor 304 of FIG. 3A.

Block feature extraction allows a detailed video object profile or description to be created. The profile or description may include parameters or representations such as object contour (represented as a polygon), area, color profile, speed, motion vector, pixel width and height, unit dimensions, real world dimension estimates, etc. Using the profile parameters, identifying and tracking objects over different video frames or sets of video frames may be possible even if some object variables change (e.g., object speed, object size on frame, object direction of movement, etc.).

The object and associated events of the object are stored in a database (e.g., video object and event database 312 of FIG. 3A) (step 472). Object and/or event attributes may be stored during and/or after any of the steps of method 450.

Behavior matching may be performed (step 474) to match known behaviors with observed/determined activities of extracted objects. Behavior matching may be performed by and have the general functionality of behavior matcher 324 of FIG. 3B. Behavior matching may include designating an event for a specific detected behavior.

Figure 12:
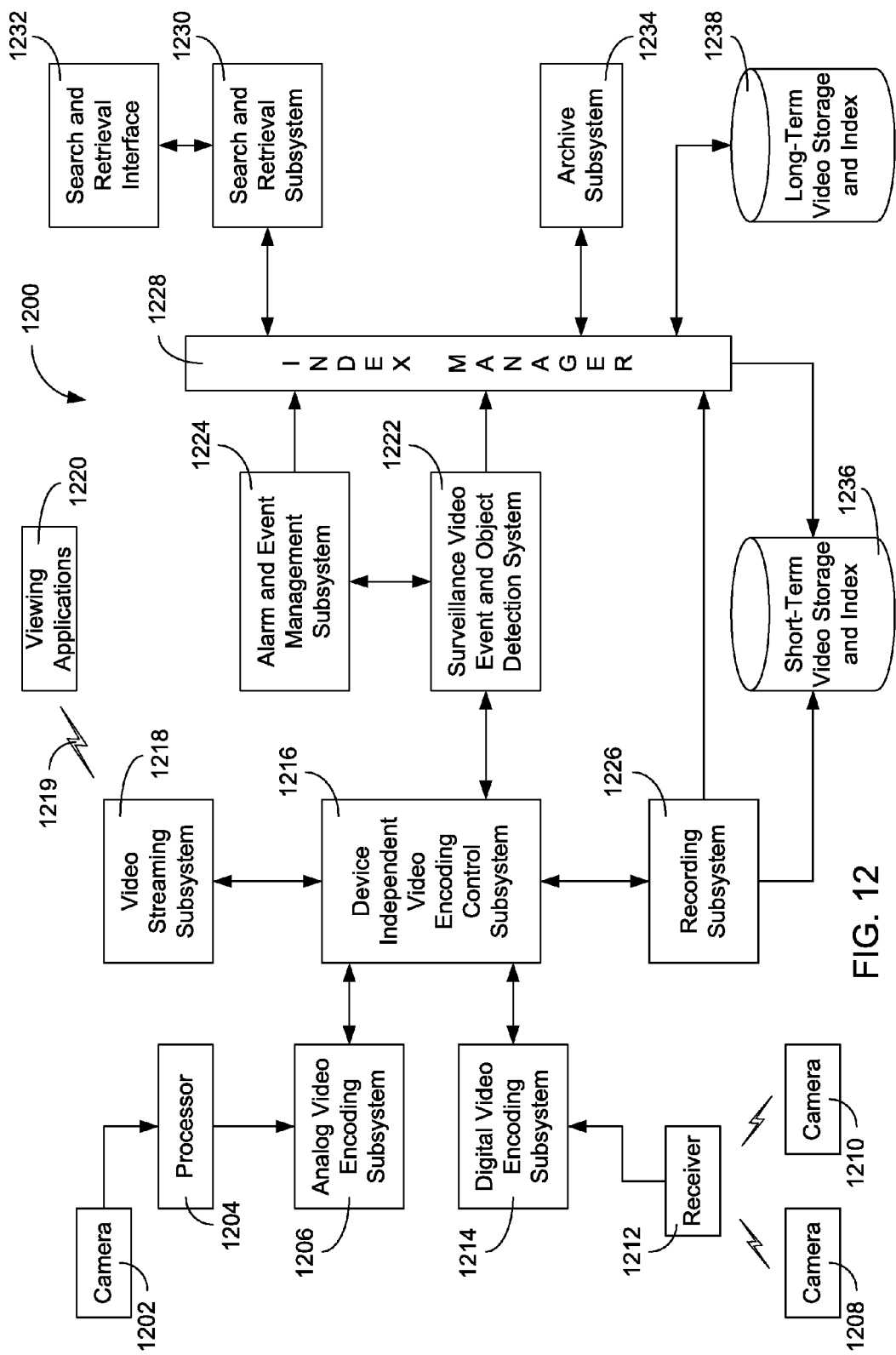
FIG. 12 is a block diagram of a video processing system used to detect, index, and store video objects and events, according to an exemplary embodiment.

Event and object indexing may be performed (step 476). Indexing may relate key words, time periods, and/or other information to data structures to support searching and retrieval activities. Objects and/or events may be stored in a relational database (step 478), a collection of text-based content description (e.g., an XML file or files) supported by an indexing system, and/or via any other data storage mechanism. An exemplary embodiment of a system for use with indexing features is shown in FIG. 12.

Figure 5A:
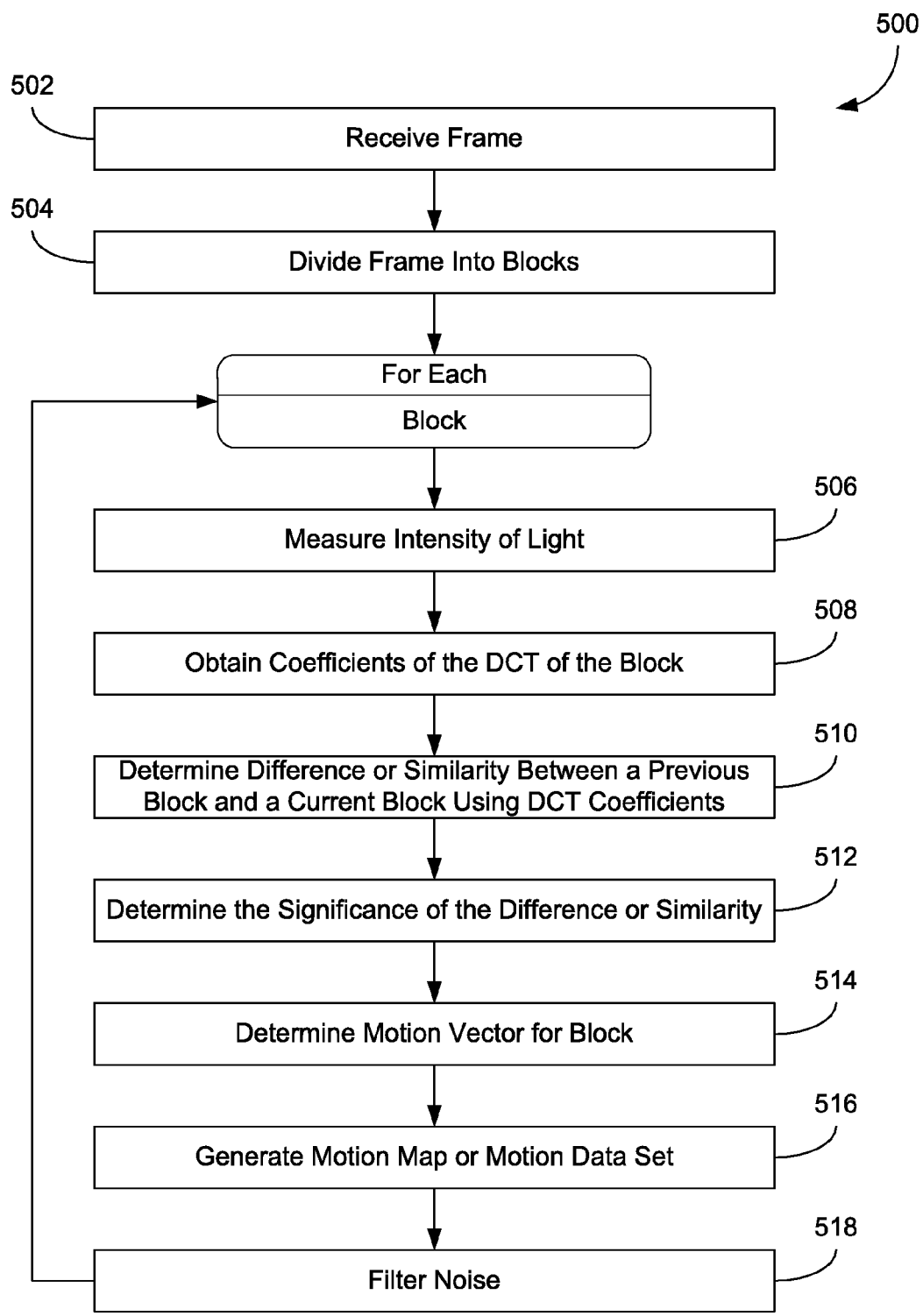
FIG. 5A is a flow diagram of a block based motion vector analysis method, according to an exemplary embodiment.

Referring to FIG. 5A, a flow diagram of a BBMVA process 500 is shown, according to an exemplary embodiment. Given an ordered set of frames $F=\{f_1 \ldots, f_n\}$ stored in a frame buffer, process 500 begins. Process 500 obtains a raw frame, a preprocessed frame, or a reconstructed frame (step 502), denoted by $f_i$, where $f_i \in F$. Process 500 also obtains the frame previous to frame $j_i$. If there is no previous frame, denoted by $f_{previous}$, then $f_{previous}=f_i$.

Upon completion of the assignment operation, process 500 begins block feature extraction (e.g., dividing the frame into blocks) (step 504). Block feature extraction divides the $f_{previous}$ signal into blocks of a predetermined unit size.

For each unit (called an image block having a location of (x, y)), process 500 measures the brightness or intensity of the light (e.g., obtaining the entropy of gray scale), denoted by $H_{x,y,luma}^{previous}=-\Sigma p_n \log_2(p_n)$ (step 506), where $p_n$ refers to a probability of a particular n color level or grayscale level appearing on the scene.

Process 500 may also obtain coefficients of a Discrete Cosine Transform (DCT) transformation of an image block for a frame with M×M image blocks (step 508). FIG. 5B illustrates the results of a coding sequence 550, according to an exemplary embodiment. The DCT may be performed on one or more color channels of the image block. Zigzag ordering may be used when analyzing the results of the DCT so that the most important coefficients are considered first. Using a DCT may allow significant video information (e.g., dominant color information, low frequency color information, etc.) to be identified and dealt with while lesser changes (e.g., high frequency color information) may be discarded or ignored.

A difference or similarity between a block of a previous frame and the same block from the current frame is determined using the DCT coefficients (step 510). According to an exemplary embodiment, a cylindrical coordinate system such as a HSL (Hue, Saturation, and Luma) color space is utilized by the process. According to such an embodiment, similarity of color between two blocks is defined as $$D_{DC}(c_{(0,0)}^{previous}, c_{(0,0)}^{current}) = 0.23606 \times \sqrt{(c_{(0,0),Luma}^{previous} - c_{(0,0),Luma}^{current})^2 +}$$

-continued $$\sqrt{(c_{(0,0),saturation}^{previous} \times \cos(c_{(0,0),hue}^{current}) - c_{(0,0),saturation}^{current} \times \cos(c_{(0,0),hue}^{current}))^2 +}$$

$$\sqrt{(c_{(0,0),saturation}^{previous} \times \sin(c_{(0,0),hue}^{previous}) - c_{(0,0),saturation}^{current} \times \sin(c_{(0,0),hue}^{current}))^2}.$$

The value of the calculated similarity may range from 0 (completely dissimilar) to 1 (exact match). A normalization constant (e.g., 0.23606 in the equation illustrated) may be provided. The first component of the equation relates to a difference in Luma. The second component of the equation relates to a difference between the blocks in color space. The third component of the equation relates to the a measure of color distance between the blocks (e.g., the distance in cylindrical HSL coordinate space).

The similarity of a spatial frequency component between two image blocks is defined as $$D_{ac}(B^{previous}, B^{current}) = \sqrt{\left(\frac{c_{1,0,c_k}^{previous} - c_{1,0,c_k}^{current}}{\sigma_{1,0,c_k}^2}\right)^2 + \left(\frac{c_{0,1,c_k}^{previous} - c_{0,1,c_k}^{current}}{\sigma_{0,1,c_k}^2}\right)^2}$$

where $\sigma_{0,1c_k}^2$ represents a standard deviation over respective coefficients over historical information (e.g., of a database, for the block location, for the frame, etc.) for each color channel $c_k$.

The significance of the difference or similarity between blocks is then determined (step 512). According to an exemplary embodiment, block similarity is computed with the following equation:

$$D_{block} = \frac{1}{\delta_H^2} |H_{x,y,luma}^{previous} - H_{x,y,luma}^{current}| + D_{ac}(B^{previous}, B^{current}) + D_{DC}(c_{(0,0)}^{previous}, c_{(0,0)}^{current}),$$

The first component of the equation relates to the determined brightness or intensity of light for the block where H is an early calculated entropy of grayscale, the second component relates to the determined similarity of a spatial frequency component between blocks, and the third component relates to the similarity of color between the blocks. Block similarity may be used to determine whether or not the block is significantly changing between frames (e.g., whether an object is moving through the block from frame to frame). Whether an object is moving through the block from frame to frame may be estimated based on the properties (location, color, etc.) of the block from frame to frame.

According to an exemplary embodiment, given a search window size, for each block in $f_{previous}$, a motion vector is computed (step 514) by using a two motion block search based on a three step search. This type of searching is described in, for example, Tekalp, A. M., *Digital Video Processing*, NJ, Prentice Hall PTR (1995). Other suitable searching methods may be used. If a previous block has been marked as "non-motion", $v_{(x,y)}=0$, or the analysis state is its first iteration, then motion estimation may use a three step search.

Based on steps 502-514, a motion map or motion data set may be generated (step 516) that describes the optical flow of image blocks (individual image blocks, grouped image blocks, etc.). The optical flow of images blocks may be determined (and the motion map or motion data generated) when block searching between frames has revealed that a block at a first frame location in $f_{previous}$ has a high degree of similarity with a different block at a second frame location in a subsequent frame.

According to an exemplary embodiment, noise may be filtered (step 518) at the end of method 500, during the various steps, prior to the method, and/or at any other time. For example, leaves of a tree blowing in the wind may be detected as noise, and then blocks corresponding to the leaves may be filtered from the motion map or motion data set (e.g., removed from consideration as significant objects). According to an exemplary embodiment, filtering includes removing blocks known to be background from consideration (e.g., background removal).

Motion Clustering

Figure 6A:
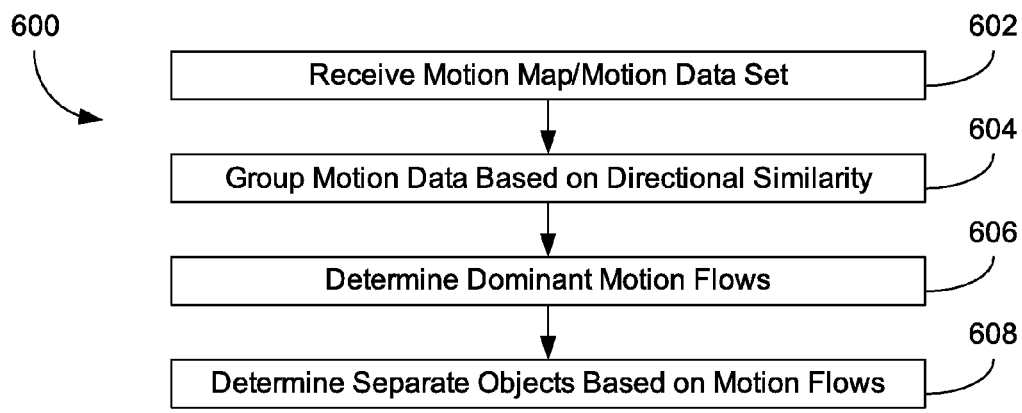
FIG. 6A is a flow diagram of a method of performing motion block clustering, according to an exemplary embodiment.

As blocks are processed, if multiple potential moving blocks are detected and portions of the blocks touch or overlap it may be possible to separate the blocks for identification as different objects using an exemplary process called motion block clustering. Referring to FIG. 6A, a flow diagram of a method 600 of performing motion block clustering is shown, according to an exemplary embodiment. Method 600 includes receiving a motion map or a motion data set (step 602). The motion map may be generated by, for example, step 516 of FIG. 5. The motion data set includes information regarding the motion for each block. For example, the motion data set may include a motion vector for the block over a series of frames (e.g., two or more frames). Blocks that move together may be determined to be blocks making up the same object.

Motion data for two or more blocks may be grouped based on directional similarity (step 604). According to various exemplary embodiments, any type of motion data may be generated and utilized (e.g., angle of movement, speed of movement, distance of movement, etc.). According to one exemplary embodiment, the motion data may be calculated and stored as vectors, containing data relating to a location (e.g., of the block) and direction of movement (e.g. from one frame to another, through a scene, etc.).

Figure 6B:
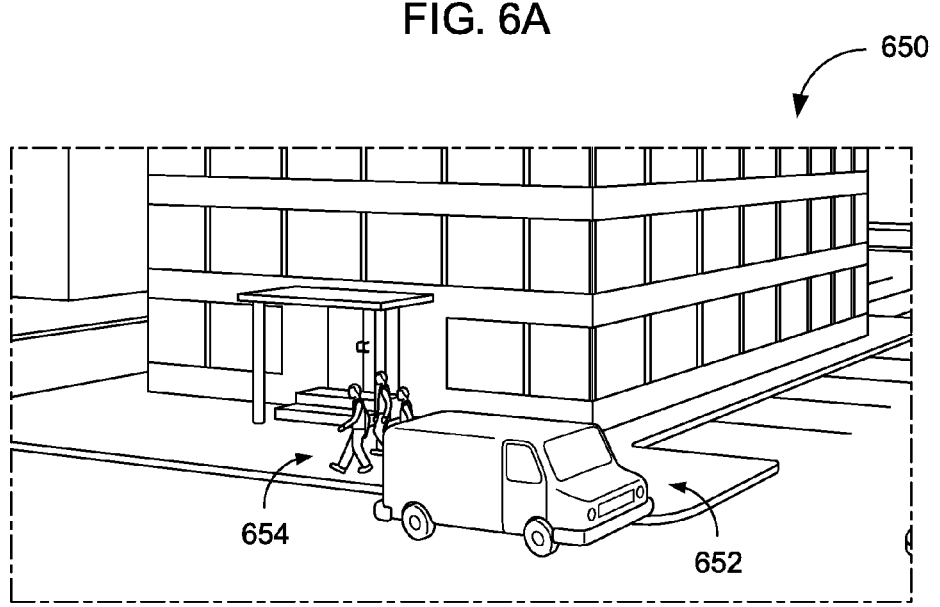
FIG. 6B illustrates of an environment with multiple objects and people to be detected, according to an exemplary embodiment.

Referring also to FIG. 6B, an illustration of a video scene 650 is shown on which motion block clustering may be performed. The system, using motion block clustering, may determine that the vehicle 652 and people 654 are different objects although their video data sometimes overlaps (e.g., as shown in scene 650).

Figure 6C:
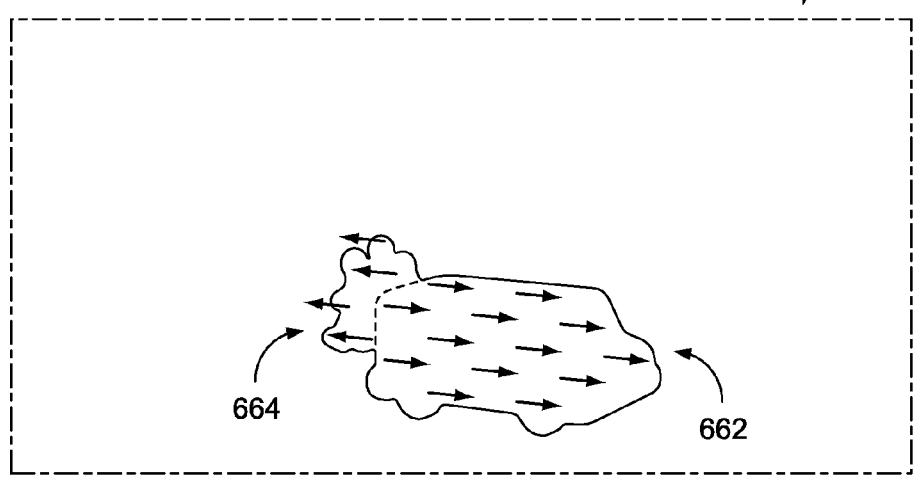
FIG. 6C illustrates the use of grouped vectors to identify the objects and people of FIG. 6B, according to an exemplary embodiment.

Referring also to FIG. 6C, a large video object may be extracted from the background as determined to be an object moving through blocks of a video scene. However, for the scene frame shown in FIG. 6B, a video processing system may have difficulty determining (a) that the blocks for people 654 and vehicle 652 are not one large object and/or (b) which blocks belong to the people and which blocks belong to the vehicle. According to an exemplary embodiment, motion data for the scene is examined (a motion map 660 such as that shown in FIG. 6C may be generated in some embodiments, wherein a motion vector is drawn for the blocks) and grouped based on directional similarity.

Dominant motion flows are determined based on the grouped motion data (step 606). Referring also to FIG. 6C, two dominant motion flows 662 and 664 are determined based on the grouped motion data.

Objects may also be separated and/or better defined based on the motion flows (step 608). For example, all blocks determined to be moving to the left for scene 650 may be determined to be a part of a "people" object while all blocks determined to be moving to the right for scene 650 may be determined to be a part of a "vehicle" object. Referring also to FIG. 6C, motion flows 662 and 664 are illustrated with boundaries, identifying the two separate objects of the view (e.g., vehicle 652 and people 654).

Handling Three Dimensional Information

In a camera view of a three dimensional scene, objects closer to the camera (e.g., in the near field) will appear larger than objects further away from the camera (e.g., in the far field). According to an exemplary embodiment, a computer-aided scene authoring tool is configured to normalize the size of objects in a video scene, regardless of location in the scene, so that the objects may be more easily processed, extracted, and/or tracked. The scene authorizing tool may be used to configure a camera remotely (or a video processing system relating to a remote camera) so that accurate scene depth information may be determined remotely without the need for physical measurements of the scene, physically holding a reference object in front of the camera, etc.

Figure 7A:
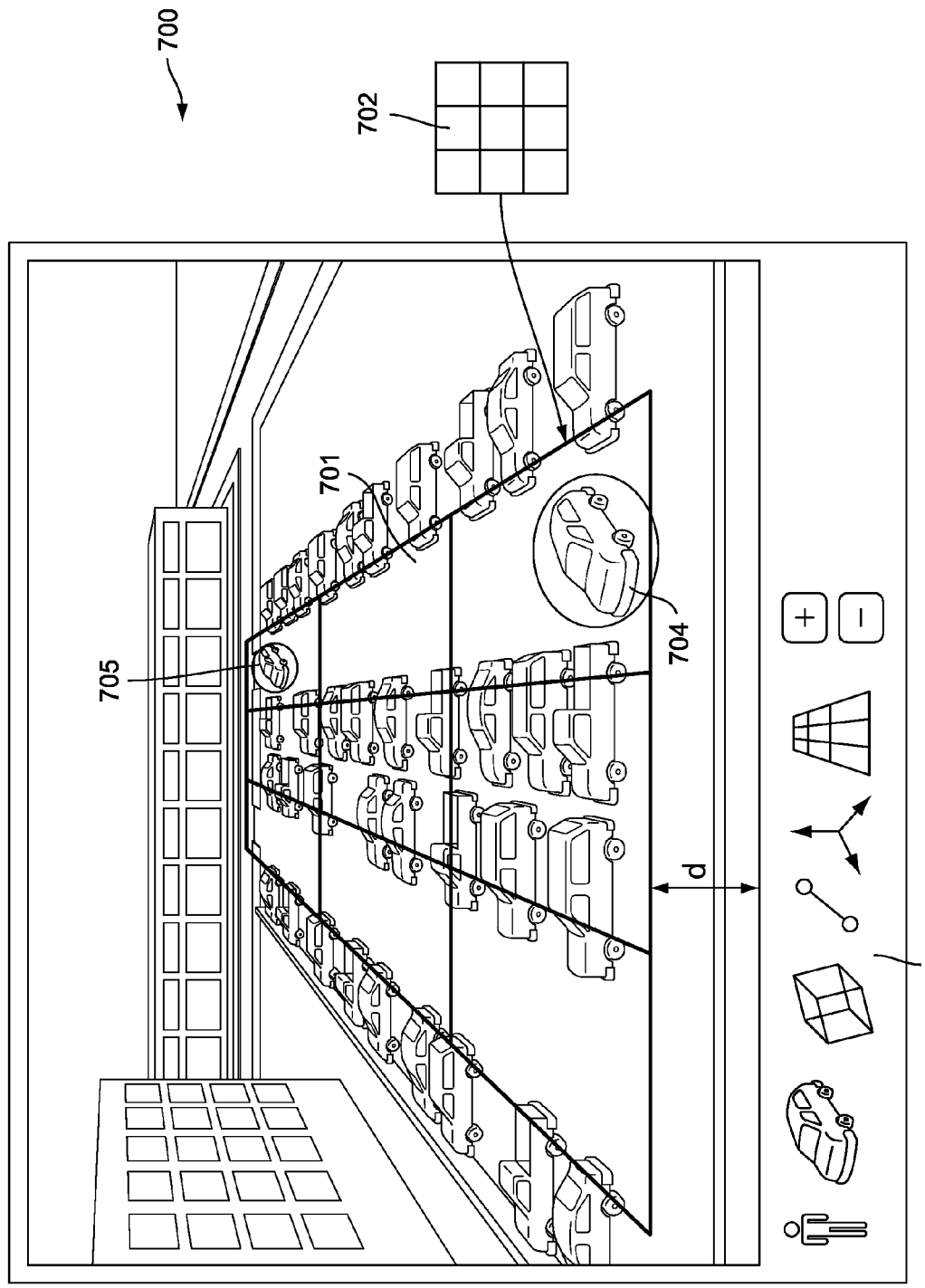
FIG. 7A illustrates a graphical user interface for configuring a system for processing video obtained from a camera, according to an exemplary embodiment.

FIG. 7A is an illustration of a graphical user interface 700 for configuring a system for processing video obtained from a camera, according to an exemplary embodiment. Interface 700 may be a scene authoring tool. Interface 700 includes a 3×3 grid 701 mapped (i.e., drawn, overlain) onto the camera view provided (e.g., a representative image of the camera view). The width and height of the rectangles outlined by grid 701 of interface 700 may be of equal size internally. The user view of the grid pattern of grid 701 may be adjusted via translations, rotations, tilt, and zoom such that grid 701 looks distorted. Grid 702 is an illustration of grid 701 without any translation, rotation, tilt, or zoom applied.

A user may add various objects to the camera view via buttons 703. For example, two vehicles 704 and 705 are shown as added to the view of interface 700. One vehicle 704 is placed in the near field (e.g., at the edge of grid 701 nearest the camera). The other vehicle 705 is placed in the far field. The size of the vehicles 704, 705 may then be adjusted based on grid 701, the camera view, and/or the user. For example, vehicle 704 is shown as being larger than vehicle 705; however, the physical size of both vehicles 704, 705 may be the same.

According to an exemplary embodiment, using the information regarding the relative sizes of the video icons 704, 705, and/or the user input for changing the grid 702 to match the perspective features of the scene, the system includes logic for determining the camera's tilt angle, a scale factor for the scene, and/or depth information for the scene.

Figure 7B:
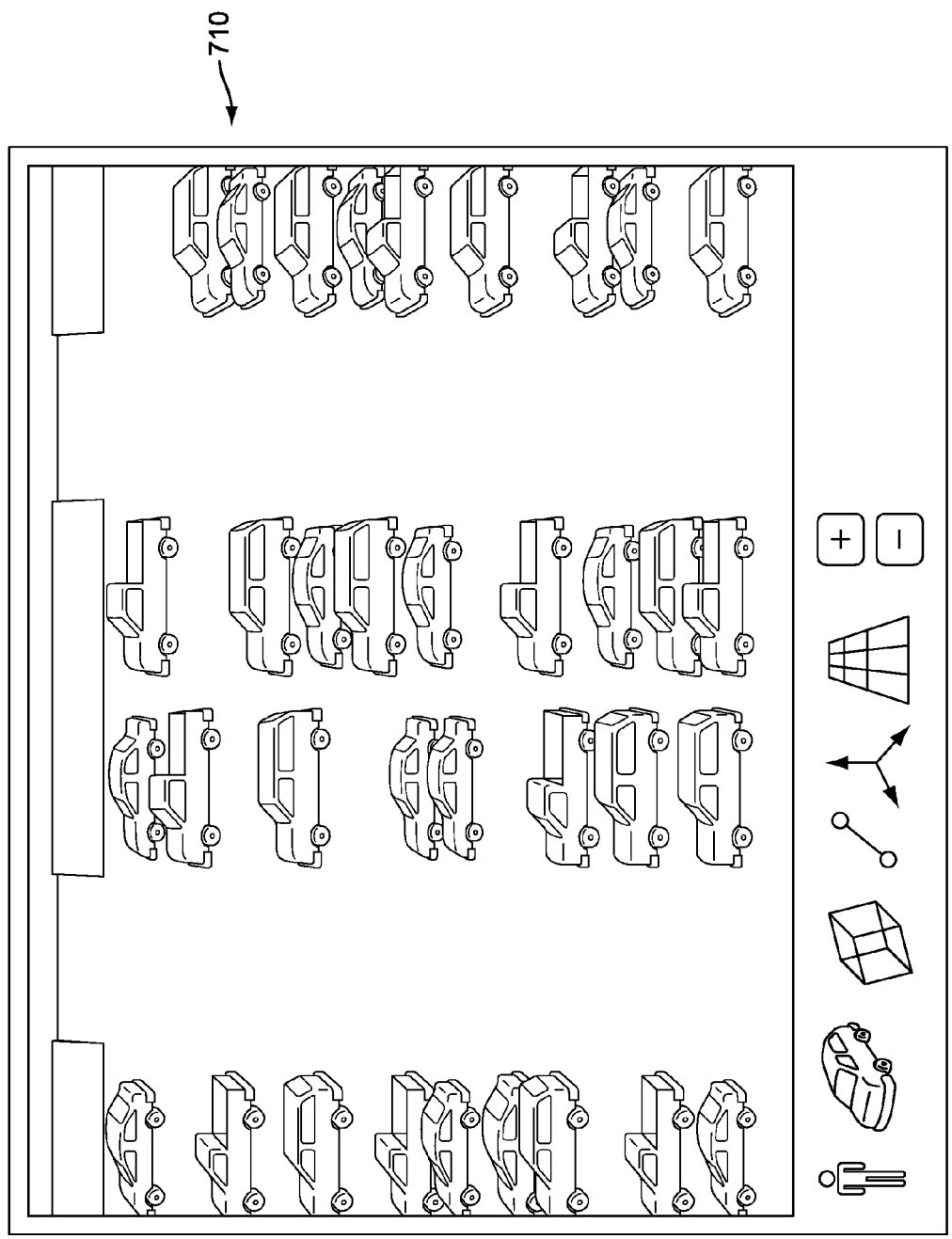
FIG. 7B illustrates video transformed by the system described with reference to FIG. 7A, according to an exemplary embodiment.

Referring now to FIG. 7B, an illustration 710 of video transformed by the system described with reference to FIG. 7A is shown, according to an exemplary embodiment. All objects are shown as being sized proportionally or roughly the same size, without regard to the scene depth. Logic in the video processing system may be configured to conduct this processing prior to any object extraction (e.g., to conduct the processing during step 452 of FIG. 4B).

Figure 7C:
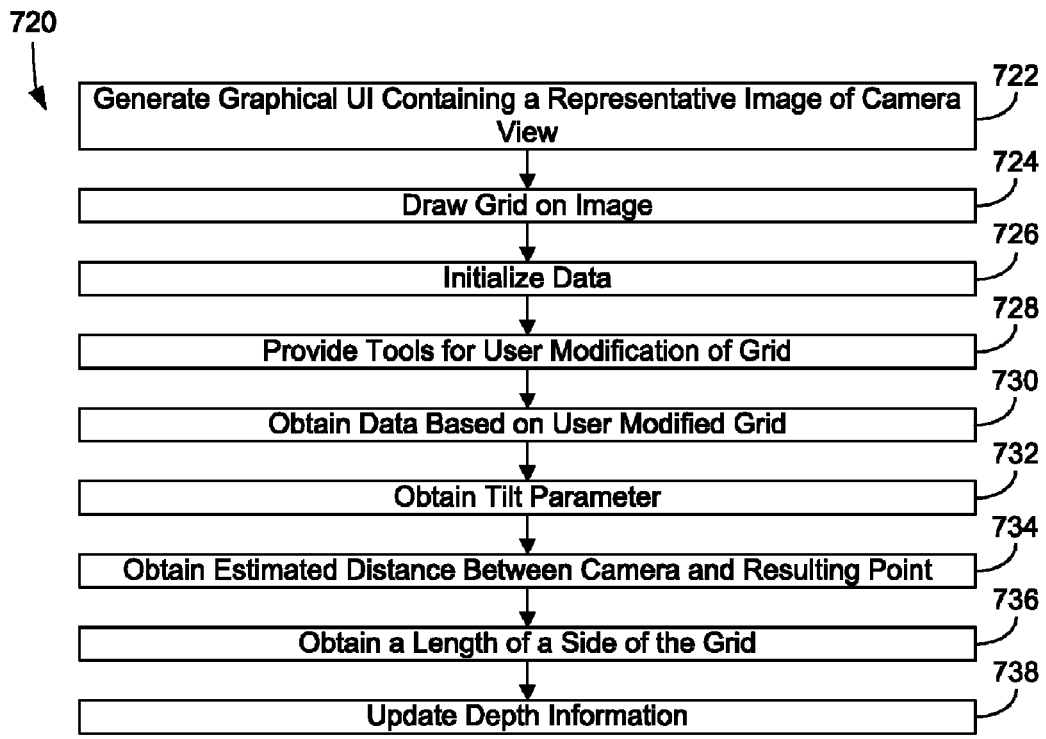
FIG. 7C is a flow diagram of a method for using input provided to a graphical user interface, such as that shown in FIG. 7B, to update a configuration of a system for processing video, according to an exemplary embodiment.

Referring to FIG. 7C, a flow diagram of a method 720 for using input provided to a graphical user interface to update a configuration of a system for processing video, such as that shown in FIG. 7B, is shown, according to an exemplary embodiment. A graphical user interface (UI) may be generated (e.g., the graphical UI of FIG. 7A) containing a representative image of the camera view (step 722). A grid is drawn on the image (step 724). The grid may be shaped as a square originally, according to an exemplary embodiment. Data may be initialized (step 726). For example, original locations for grid points relative to the image may be extracted, stored, and/or used to calculate and store other values.

Tools for modifying the grid may be provided by the graphical UI (step 728). For example, buttons 703 of FIG. 7A may be provided for altering the grid. The user may alter grid properties using the graphical UI. Data regarding the modified grid may be obtained (step 730). The location of the grid may be modified via a translation, via "stretching" of the grid, via moving the location of the grid to cover various parts of the image, etc. According to an exemplary embodiment, the shape of the grid in the graphical UI is manipulated to match perspective features of the representative view.

A tilt parameter associated with the camera view and image is obtained (step 732). The tilt parameter may be related to the camera tilt angle. Determining the camera tilt angle is illustrated in greater detail in the description referencing FIGS. 7F and 7G.

An estimated distance between the camera and a resulting point is obtained (step 734). For example, referring also to FIG. 7A, the actual distance d between the point at the image bottom and the point at the bottom of grid 701 may be found, automatically estimated, and/or manually entered.

A length of a side of the grid may be obtained (step 736) (e.g., from memory, estimated by the system, entered by a user). Depth information may be updated for the grid as a result of knowing the grid side length (step 738), allowing the system to determine the actual depth of the scene and/or any object in the image. For example, referring to FIG. 7A, vehicle 704 is shown in one grid box while vehicle 705 is shown in a grid box two boxes away. It may be determined that vehicle 704 is at a depth d (where d represents the distance as found in step 734) and that vehicle 705 is at a depth d+a*2 (where a represents the length of the side of the grid as found in step 736). The depth information may be used for tracking, extracting images, and/or for describing images. According to an exemplary embodiment, the determined depth information is used to effectively handle visual occlusion.

Figure 7D:
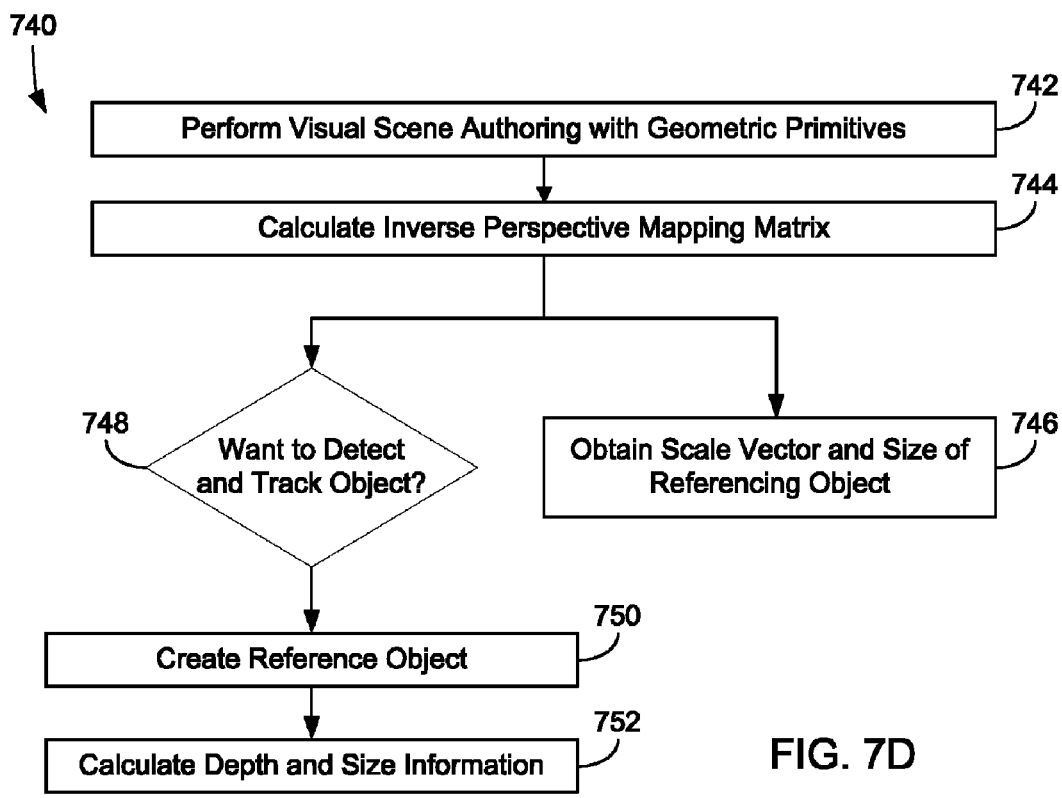
FIG. 7D is a flow diagram of a method for determining depth and size information for a video processing system relating to a camera, according to an exemplary embodiment.

Referring to FIG. 7D, a flow diagram of a method 740 for determining depth and size information for a video processing system relating to a camera is shown, according to an exemplary embodiment. Visual scene authoring is performed with geometric primitives (step 742) as discussed in FIGS. 7A-7C. An inverse perspective mapping matrix may be calculated (step 744) for the scene. Using the matrix, a scale factor and size of a referencing object may be obtained (step 746). The scale factor and reference object size values may allow a variety of calculations that would be difficult otherwise in a scene having depth. For example, objects in the far field and the near field may be identified as having the same physical size. By way of further example, the system may be able to determine that a small video object in the far field is actually a large object (e.g., a vehicle).

A user may specify whether he/she desires to detect and track an object (step 748). If so, a reference object may be created for the object (step 750). Depth and size information may be calculated for the object based upon where the object is placed in the grid of the graphical UI (step 752) by the user.

Figure 7E:
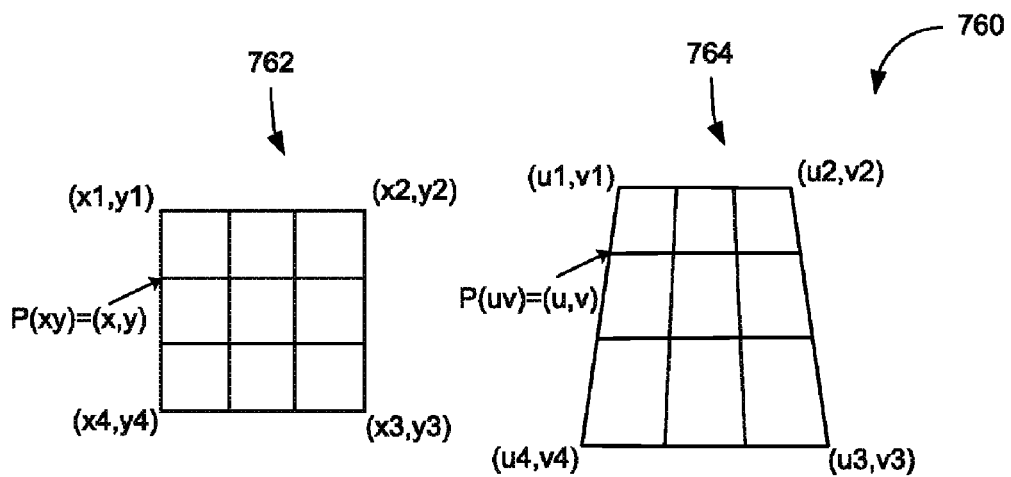
FIG. 7E illustrates a grid changed via the graphical user interface of FIG. 7A and using the grid to estimate camera parameters, according to an exemplary embodiment.

Referring now to FIG. 7E, an illustration 760 of a grid changed via the graphical user interface of FIG. 7A is shown, according to an exemplary embodiment. Grid 762 may correspond to the proportional grid 702 of FIG. 7A and grid 764 may be the transformed grid 701 of FIG. 7A. Various points on the two grids 762, 764 are shown to illustrate the transformation between the two grids. The corner points as shown in grid 762 may be used to calculate (using an inverse function) the corner points as shown in grid 764. According to one exemplary embodiment, a matrix calculation may be used. Finding the mapping between points of grids 762, 764 (e.g. the mapping between points (x1, y1), (u1, v1); (x2, y2), (u2, v2); (x3, y3), (u3, v3); and (x4, y4), (u4, v4)) may be done via a Gauss elimination, using the matrix:

$$\begin{pmatrix} u1 & v1 & 1 & 0 & 0 & 0 & -u1x1 & -v1x1 \\ u2 & v2 & 1 & 0 & 0 & 0 & -u2x2 & -v2x2 \\ u3 & v3 & 1 & 0 & 0 & 0 & -u3x3 & -v3x3 \\ u4 & v4 & 1 & 0 & 0 & 0 & -u4x4 & -v4x4 \\ 0 & 0 & 0 & u1 & v1 & 1 & -u1y1 & -v1y1 \\ 0 & 0 & 0 & u2 & v2 & 1 & -u2y2 & -v2y2 \\ 0 & 0 & 0 & u3 & v3 & 1 & -u3y3 & -v3y3 \\ 0 & 0 & 0 & u4 & v4 & 1 & -u4y4 & -v4y4 \end{pmatrix} \begin{pmatrix} a \\ b \\ c \\ d \\ e \\ f \\ g \\ h \end{pmatrix} = \begin{pmatrix} x1 \\ x2 \\ x3 \\ x4 \\ y1 \\ y2 \\ y3 \\ y4 \end{pmatrix}.$$

The result of the inverse perspective mapping may be the view of FIG. 7B.

Figure 7F:
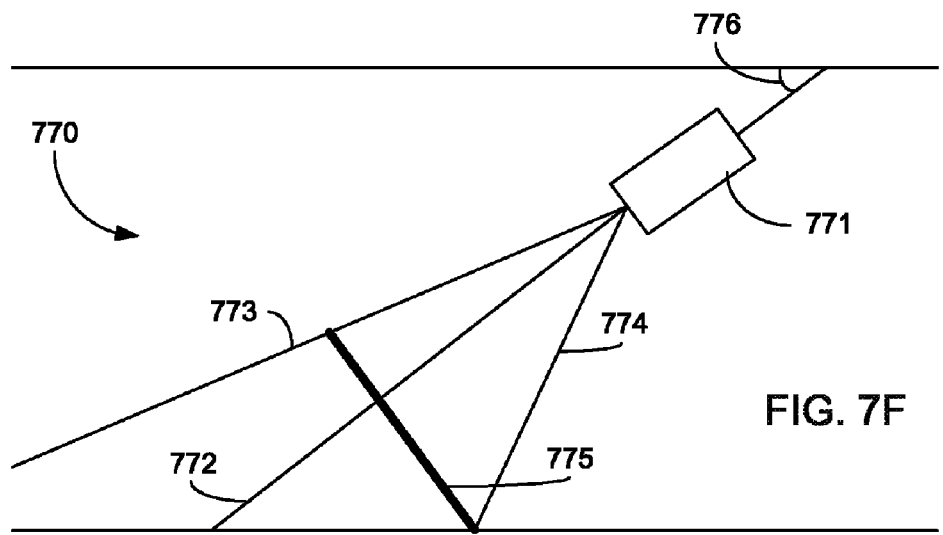
FIG. 7F illustrates a default grid pattern location when overlaid on the image of FIG. 7A, according to an exemplary embodiment.
Figure 7G:
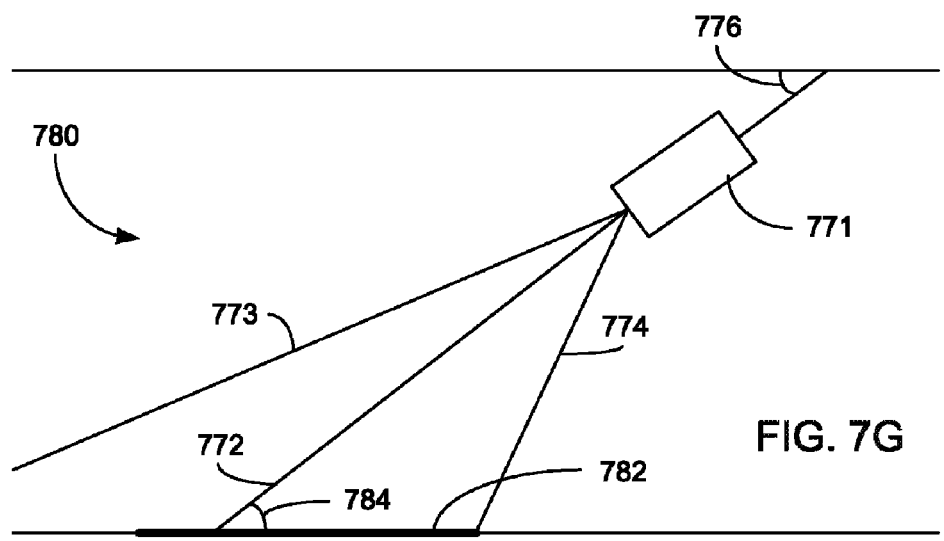
FIG. 7G illustrates a tilted grid pattern and using the tilted grid pattern to approximate the tilt angle, according to an exemplary embodiment.

Referring to FIGS. 7F and 7G, diagrams 770 and 780 of calculating a tilt angle 776 of a camera are shown, according to an exemplary embodiment. In FIG. 7F, the grid pattern 775 (corresponding to original/proportional grid originally drawn by the system before the transformation from 702 to 701 shown in FIG. 7A) is shown as perpendicular to camera 771. Camera 771 has sight lines defined by center sight line 772, upper sight line 773, and lower sight line 774. Center sight line 772 is perpendicular to grid pattern 775. Tilt angle 776 of camera 771 is initially unknown.

In FIG. 7G, grid pattern 782 is shown on the ground (or other surface), and is used to find the tilt angle 776 of camera 771 as illustrated. Changing the shape of the proportional grid (e.g., grid 702) to a grid matching the perspective features of a representative image (e.g., changed grid 701) effectively places the grid pattern on the ground such as illustrated in FIG. 7G as grid 782. Using information regarding the changed grid, the angle between center line 772 and the ground may be determined. A process may then determines the geometry of various triangles shown in FIGS. 7F and 7G (e.g., the triangles created using sight lines 772, 773, 774) using dimensions of proportional grid 775, scale factor information, calculated depth, stored distance information, information regarding the actual physical dimensions associated with the changed grid 782, and/or information regarding the extent to which the user changed the proportional grid. For example, knowledge that center line 772 is perpendicular to proportional grid 775 of FIG. 7F may be used to obtain a right angle, stored information regarding dimensions of proportional grid 775 may be used to obtain one or more triangle sides, and information regarding how much the grid was stretched may be used to obtain the distance on the ground between sight line 774 and line 772. The geometry of the triangle may then be used to calculate angle 784. The process may then determine that tilt angle 776 is equal to angle 784 and/or may conduct additional calculations to estimate tilt angle 776 based on angle 784.

Improving Video Processing Speed

Transforming an entire scene (e.g., as shown in FIG. 7B) may be computationally expensive. According to an exemplary embodiment, only portions of the scene may be transformed, rather than the entire scene.

As shown and discussed in FIGS. 7A-G, grid patterns may be used for camera calibration, where the grid consists of N×N blocks. Using the grid patterns, depth levels may be determined. According to an exemplary embodiment, the logic of the video processing system is configured to assign unit size for processing (e.g., block size) incrementally, based on depth.

Referring to FIG. 8, a diagram 800 of selected concepts utilized in improving the performance of a video processing system is shown, according to an exemplary embodiment. Grids 802 and 804 are shown as grids before and after perspective mapping has occurred, respectively. Grid 804 includes two objects 806 and 808, shown in a relatively near field and far field, respectively. Grid 804 further includes three depth levels (near field depth level 810, mid-field depth level 812, and far field depth level 814).

Using the determined depth information, the depth levels 810, 812, 814 of grid 804 may be assigned depth levels 822, 824, and 826 in grid 820, respectively. For example, in near field depth level 822, objects are near to the camera and appear relatively large in video. Accordingly, an exemplary video processing system is configured to determine that a large block may be needed to detect an object. However, in far field depth level 826, all objects may be far away from the camera, appearing relatively small in video. The exemplary video processing system may determine that many small blocks within level 826 are needed in order to detect, extract, and/or to pinpoint the location of an object. In other words, unit sizes for processing blocks in the near field are calculated to be of a large size while the unit sizes for processing blocks in the far field are calculated to be of a small size.

One result may be the use of different image analysis techniques for different objects. For example, objects in depth level 822 may be easy to recognize and analyze since the size of the object in the view is relatively large. Alternatively, fine grained (e.g., pixel level) processing may be necessary for objects located in depth level 826 in order to properly detect and track the object. According to an exemplary embodiment, processing time is decreased as a reduced number of blocks are considered, compared, and/or tracked in near field and mid-field depth levels 822 and 824 regions relative to the far field depth level 826 region.

According to an exemplary embodiment, a method for determining the appropriate unit size (i.e., processing block size) per field includes considering a typical object to be extracted and/or tracked (e.g., a vehicle). A representative shape/icon for the object type is placed in the far field (e.g., using the graphical user interface) and another representative shape/icon for the object type is placed in the near field (as illustrated in FIG. 8). Given two estimated object sizes, an appropriate level of process granularities per field is determined. For the near field object, the system attempts to fit the object into a first block size (e.g., a small block size); if the object does not fit into the small block size, the block size is enlarged until the object will fit into a single block. This process is repeated for all depth levels/regions. According to an exemplary embodiment, this process results in the unit sizes that will result in fast yet acceptably accurate processing granularity for each region.

Once the methods of FIGS. 7A-8 are applied to a camera view, the results may be stored in a configuration file, stored in a ground truths database, or the results may otherwise be used to change the processing used in normal operation of the camera.

Figure 9A:
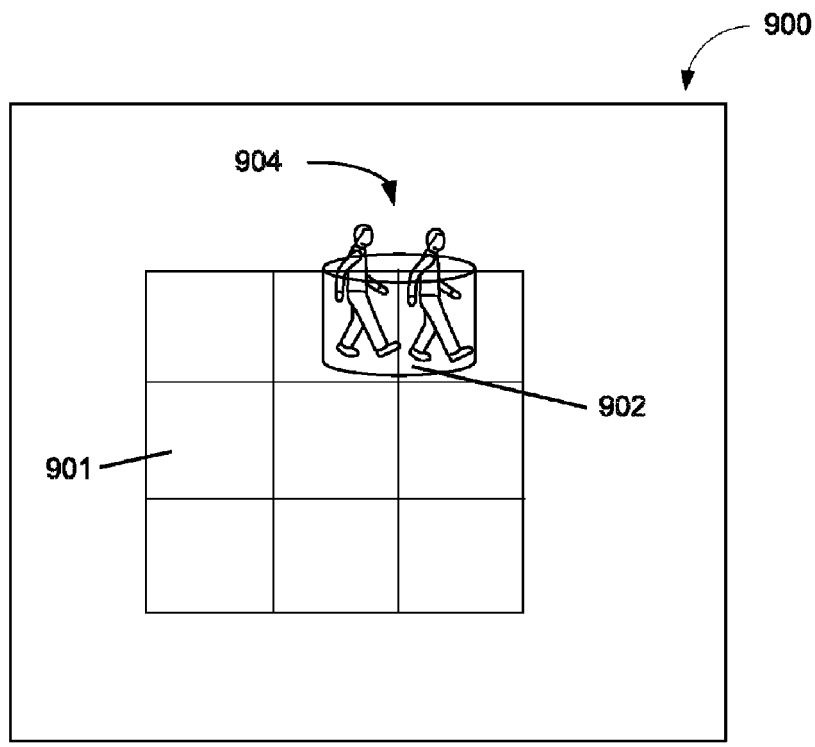
FIG. 9A illustrates a step in a method for estimating the number of objects in a scene, according to an exemplary embodiment.

When objects overlap in fields of view, it can be computationally expensive to count the number of objects, especially if the objects are overlapping and/or moving in the same direction. According to an exemplary embodiment, elliptical cylinders may be used to assist in the process of identifying and counting separate objects. Referring now to FIG. 9A, an illustration of a step in a method for estimating the number of objects in a scene is shown, according to an exemplary embodiment. In FIG. 9A, a cylinder 902 is shown projected onto a detected object 904 within grid 901. The height of cylinder 902 may be configured to be slightly shorter (or the same as, or nearly the same as) than the detected height of a target object or group of objects 904, while the bottom of cylinder 902 may be aligned with the bottom of object 904 or group of objects 904.

Figure 9B:
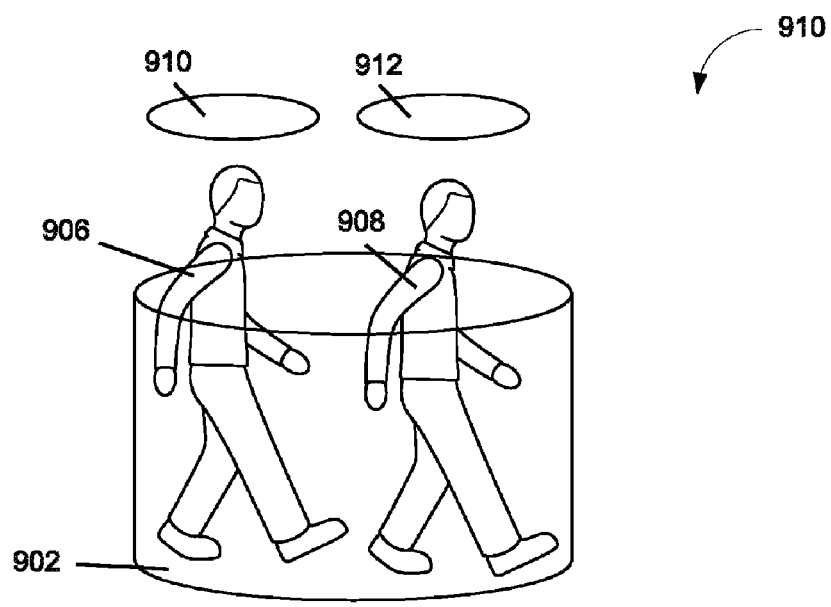
FIG. 9B illustrates a subsequent step in the method for estimating the number of objects in a scene described with reference to FIG. 9A, according to an exemplary embodiment.

Referring now to FIG. 9B, cylinder 902 and object 904 are illustrated in greater detail. Object 904 is shown as two people 906 and 908. The top of cylinder 902 may be fit with unit ellipses of a size set during a configuration process for the object type. For example, when configuring a "people" object type, a user or an automated process may set a certain ellipse size as being roughly equal to a video size for a person at the tilt angle of the camera.

According to an exemplary embodiment, the number of people within cylinder 902 is estimated by determining the number of ellipses (e.g., of an ellipse size associated with people) that can fit into the top of the cylinder. With reference to the example shown in FIG. 9B, two "people" ellipses 910 and 912 may be determined to fit in the top of cylinder 902, so the system estimates that two people are within cylinder 902.

Another exemplary embodiment attempts to cover object content within the top of the cylinder. Since the height of cylinder 902 is less than the height of an object within cylinder 902, the system may determine how many ellipses are required to cover the object video corresponding to the top of cylinder 902. In the example in FIG. 9B, two ellipses 910, 912 are required over the top of cylinder 902 to cover video of the two objects in the cylinder top. Therefore, the method may conclude that there are two separate objects (people 906, 908) within cylinder 902.

Trajectory and Tracking Information

Once an object has been extracted and/or identified over multiple frames of a frameset, it may be desirable to find a representative view of the object for video object classification, recognition processing, storing, and indexing. This process may help avoid multiple registrations of a moving object and may improve recognition, classification, and/or query accuracy.

Figure 10A:
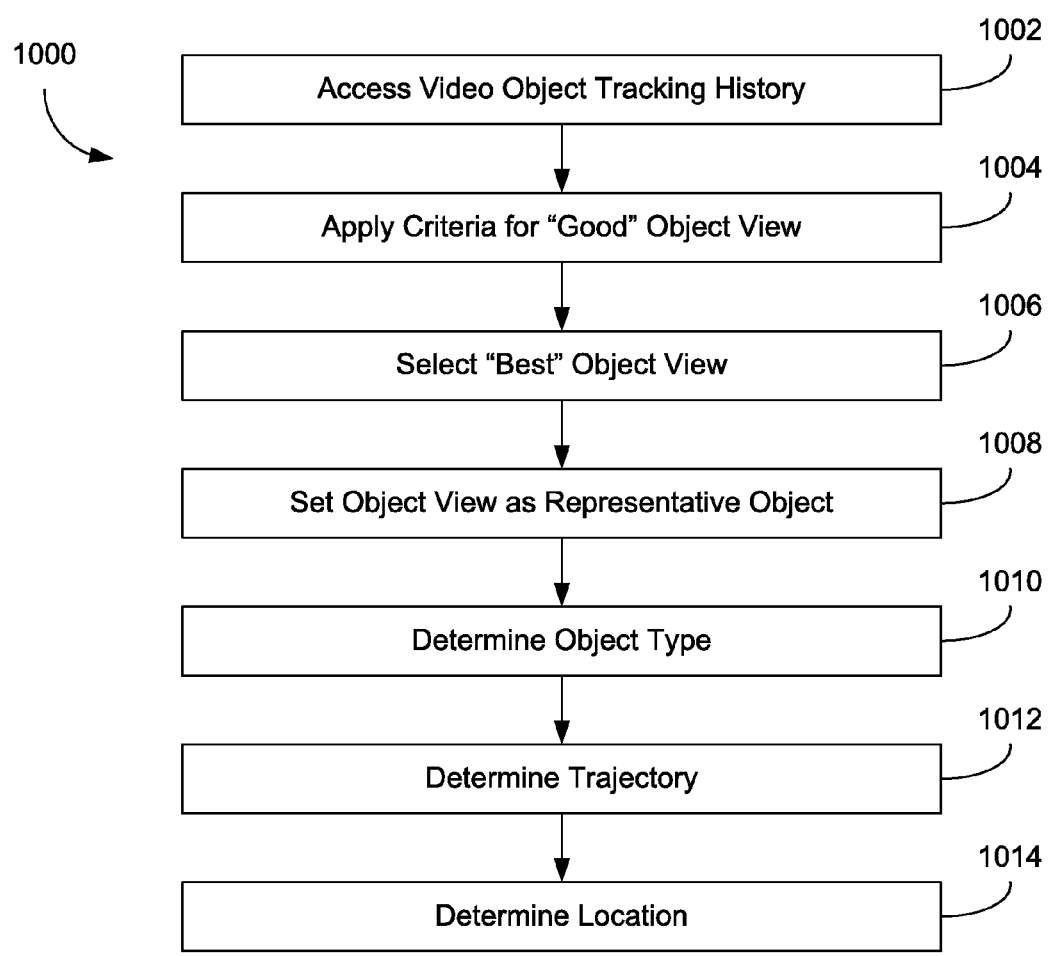
FIG. 10A is a flow diagram of a method of tracking and determining a representative object, according to an exemplary embodiment.

Referring to FIG. 10A, a flow diagram of a method 1000 of tracking and determining a representative object for an object is shown, according to an exemplary embodiment. The video object tracking history may be accessed (step 1002). The tracking history may include video and/or frames for which the presence of a particular video object is detected. For example, referring also to the series of frames 1020 of FIG. 10B, four frames 1021, 1022, 1023, 1024 are shown as four frames accessed via the video object tracking history. Frames 1025, 1026, 1027, 1028 illustrate an output of an object extraction and object tracking process. For example, people and a vehicle are illustrated as objects defined by a boundary and may additionally have a motion vector or property.

For each video frame of the video, criteria for finding a "good" object view is applied (step 1004). Criteria for a good object view for classification may include size, symmetry, color uniformity (e.g., a good object view for classification may be a frame of an object where the color information is within a certain variance of colors the target displays as it moves throughout the frameset), other object enclosures (e.g., given a region of interest, "object enclosure" may represent how an object is being overlapped with a region of interest), etc. For example, referring also to FIG. 10B, four frames 1021-1024 are shown where a vehicle and people are visible. Frames 1021-1024 are analyzed such that objects (e.g., the vehicle and people) may be detected and outlined as shown in frames 1025-1028. For each frame, criteria for finding a good object view may be applied, for the desired object (the vehicle or the people).

The "best" object view is selected based on the criteria (step 1006) and the object view is set as the representative object of the object (step 1008). For example, in FIG. 10B, for a vehicle, it may be determined that frame 1023 illustrates the vehicle better than the other frames because the size of the vehicle in frame 1023 is the largest non-obscured view of the vehicle in frames 1021-1024.

Figure 10B:
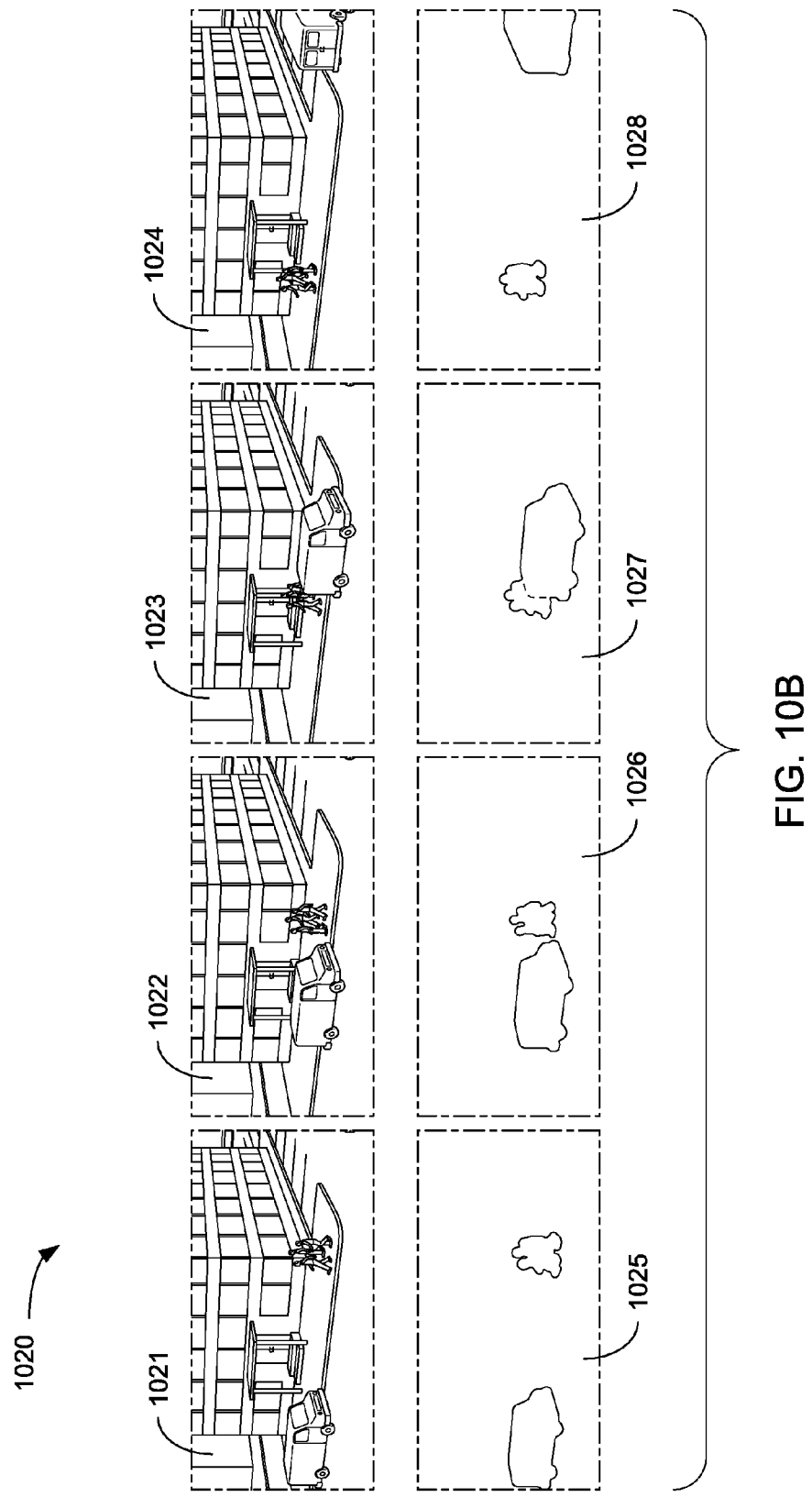
FIG. 10B illustrates of tracking and determining a representative object, according to an exemplary embodiment.

An object type (step 1010), trajectory (step 1012), and location (step 1014) may be determined. A representative object (e.g., a good object for classification) may be represented using <object, trajectory, location> triplets which describe the behavior of the tracked and extracted object within any given frame set (e.g., a frame set defined by start time and stop time). The object component may be a multi-dimensional vector-described object and contain color and shape information of the object. The location component may refer to a location on a two-dimensional frame grid. The trajectory component may refer to an object's direction and speed of trajectory. Referring also to FIG. 10B, the location of the vehicle may be recorded, along with vehicle color, shape, trajectory, and other properties.

Figure 10C:
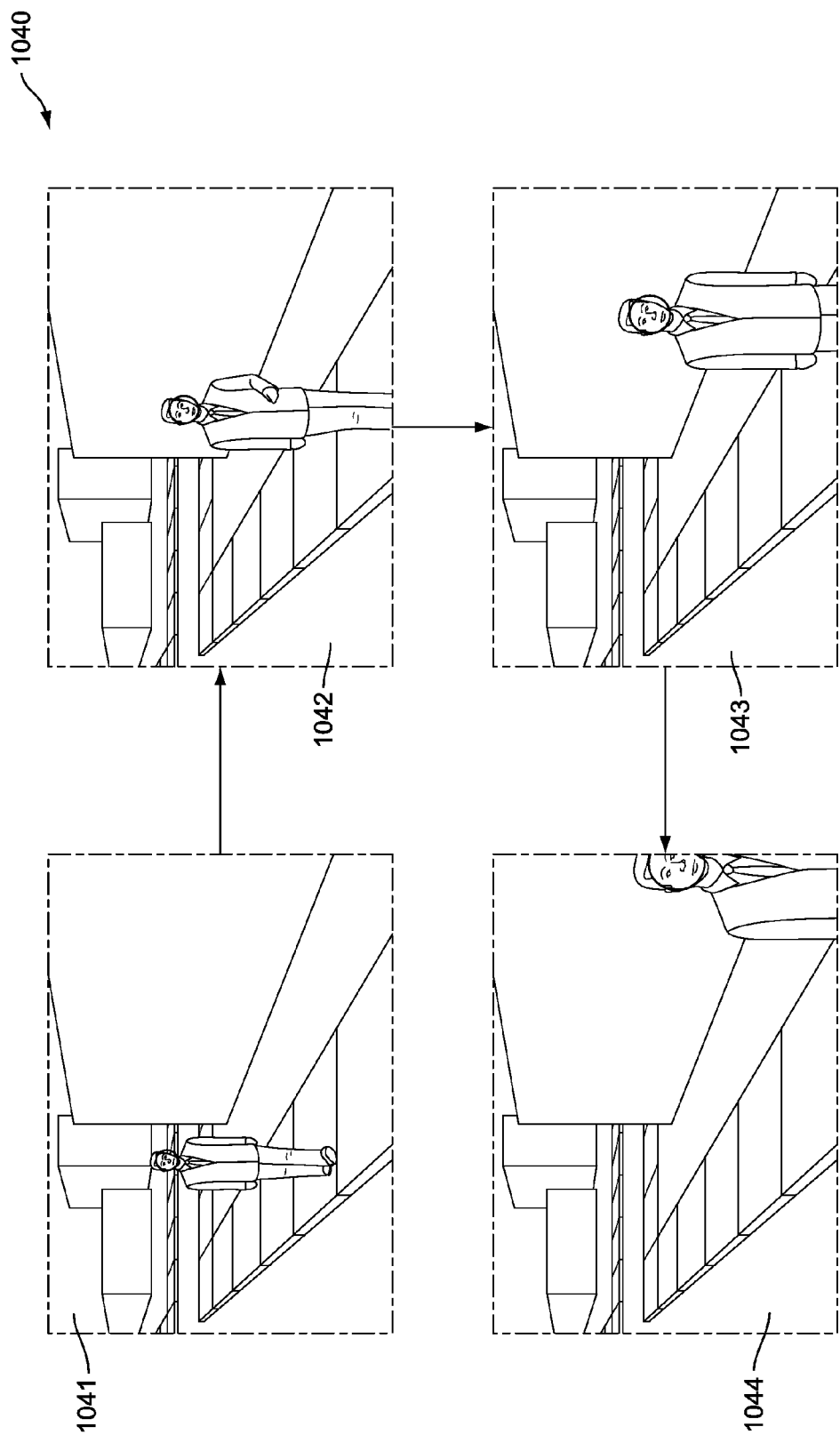
FIG. 10C illustrates of tracking and determining a representative object, according to another exemplary embodiment.

Referring to FIG. 10C, another example of a process of determining a representative object is illustrated, according to an exemplary embodiment. Frames 1041, 1042, 1043, 1044 may be four frames accessed via the video object tracking history. Based on method 1000 of FIG. 10A, the process may determine frame 1043 to provide the best view of a face as shown. The process may determine the best view based on the clarity of the frame, size of the object in the frame, complete view of the frame (e.g., in frame 1044, part of the face is only partially shown), etc.

Figure 10D:
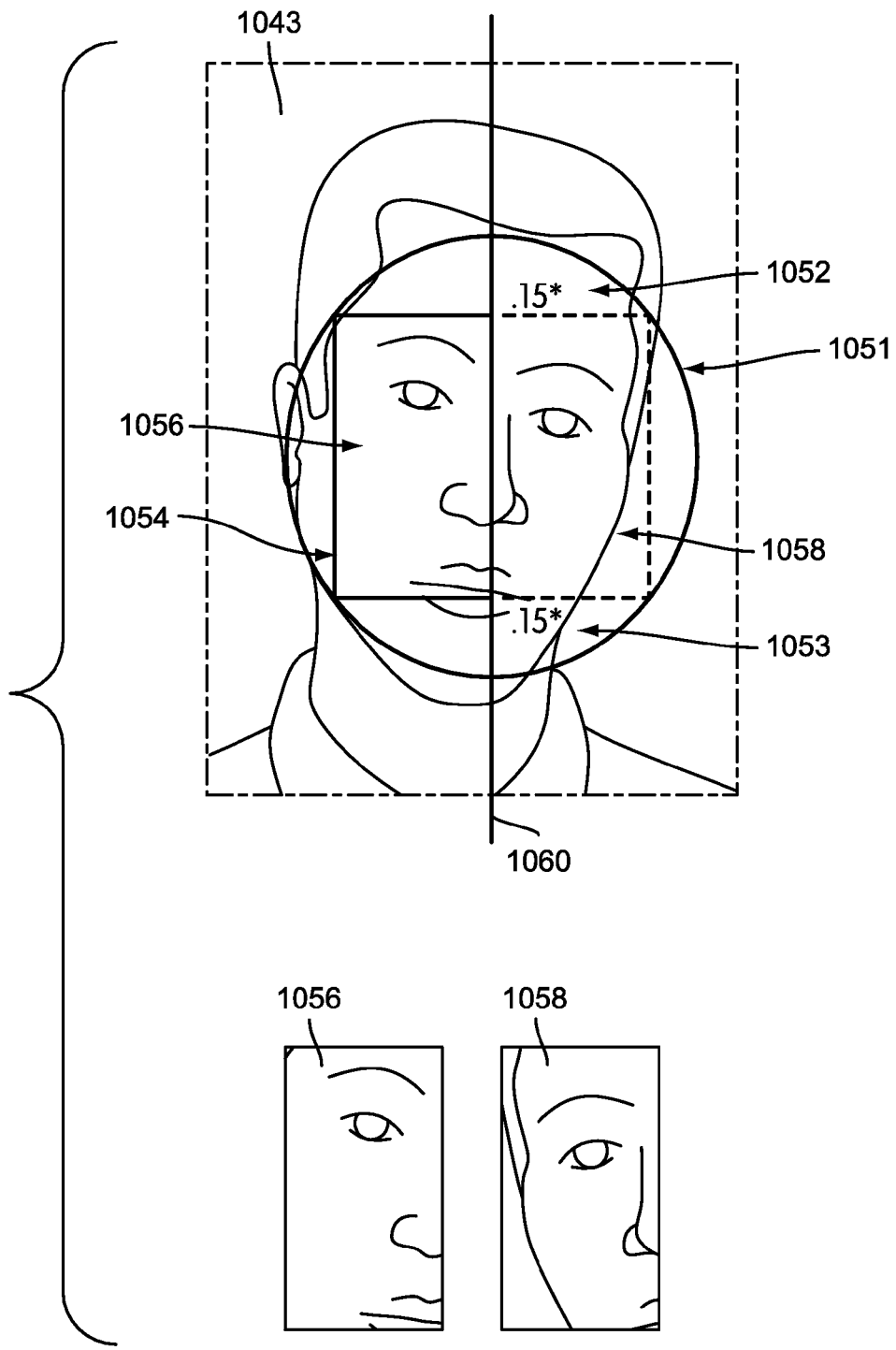
FIG. 10D is a more detailed illustration of a frame of FIG. 10C, according to an exemplary embodiment.

Referring now to FIG. 10D, frame 1043 is shown with the detected face in greater detail.

Figures 10E, 10F:
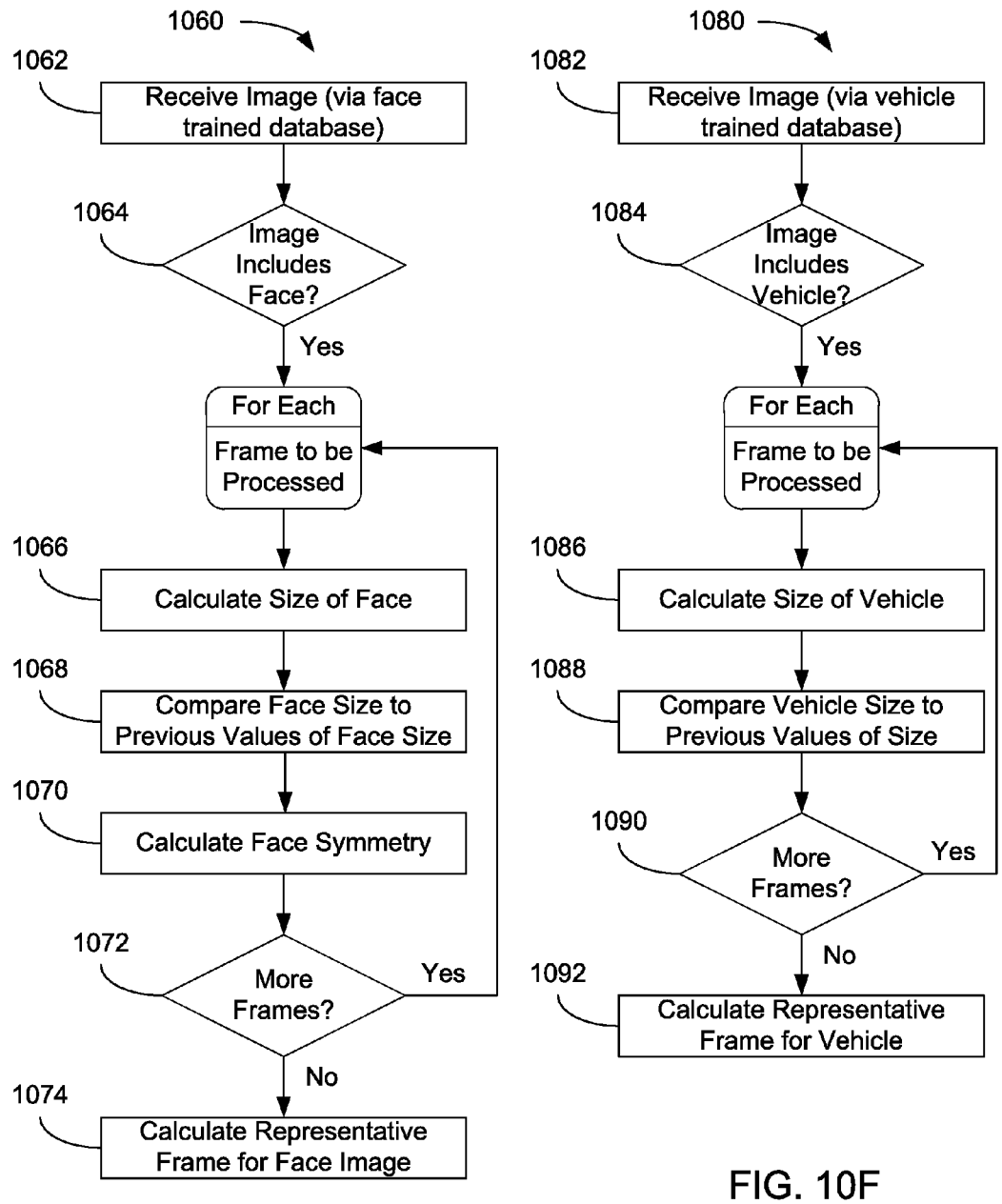
FIG. 10E is a flow diagram of a method of face detection, according to an exemplary embodiment.
FIG. 10F is a flow diagram of a method of vehicle detection, according to an exemplary embodiment.

Referring to FIG. 10E, a flow diagram of a method 1060 of face detection is shown, according to an exemplary embodiment. An image may be received (e.g., via a face trained database, via method 1000, etc.) (step 1062). Method 1060 may determine if the image provided includes a face to be analyzed for face detection (step 1064). If not, method 1060 may obtain another image or wait for another image to be provided.

For each frame of the image, the size of the face in the image is be calculated (step 1066). The face size as calculated is compared to previous face sizes calculated for previous frames (step 1068). For example, the largest face size calculated is stored in addition to face sizes for all frames.

Face symmetry may be calculated (step 1070). Referring also to FIG. 10D, according to one exemplary embodiment, the face may be represented as a face location using circle 1051. The top region 1052 and bottom region 1053 (e.g., the top 15% and bottom 15%) of the region encapsulated by circle 1051 may be discarded to avoid capturing non-face attributes. A square 1054 may be formed as a result of the discarding. Two rectangular regions 1056 and 1058 of square 1054 may be defined along the center line 1060 of circle 1051. One of the regions 1058 may be flipped and compared with the other region 1056 in order to calculated the normalized correlation between the two frames. FIG. 10D illustrates the two regions 1056, 1058 of the face compared to each other. The normalized correlation is used to determine the face symmetry and the value is stored for each frame. Face symmetry calculation may also include accounting for contrast.

If there are more frames, method 1060 repeats until no more frames are left (step 1072). Once all frames are used, a representative frame is calculated based on the calculations in steps 1066 and 1070 (step 1074). Given the values for face size and symmetry, method 1060 calculates the best face. For example, one equation to determine the "best" face may be: $\alpha*(Size\_of\_Face)*\beta*(Symmetry\_of\_Face)$, where $\alpha$ and $\beta$ may be pre-determined constants, the variable Size_of_Face may be a face size value, and the variable Symmetry_of_Face may be a value corresponding to the level of symmetry of the two halves of the face. The video processing system is configured to select the frame and/or object view with the highest calculated value as the representative frame/object view for the object. Additionally, step 1074 may include the process of sorting the frames based on the calculated value.

Referring to FIG. 10F, a flow diagram of a method 1080 of vehicle detection is shown, according to an exemplary embodiment. An image is received (e.g., via a vehicle trained database, via method 1000, etc.) (step 1082). The image provided is evaluated to determine if it includes a vehicle to be analyzed for vehicle detection or further analysis (step 1084). If not, another image is obtained or the processor waits for another image to be provided.

For each frame of the image, the size of the vehicle in the image may be calculated (step 1086). The vehicle size as calculated may be compared to previous vehicle sizes calculated for previous frames (step 1088). For example, the largest vehicle size calculated may be stored in addition to vehicle sizes for all frames. Additionally, a bounding rectangle that encapsulates the vehicle may be formed.

If there are more frames, method 1080 may repeat until no more frames are left (step 1090). Once all frames are used, a representative frame is calculated based on the calculations in step 1086 (step 1092). For example, step 1092 may include finding frames where a bounding rectangle for a vehicle does not interfere with image boundaries. Step 1092 may further include finding the largest size associated with a vehicle whose bounding rectangle does not interfere with image boundaries.

Methods 1060 and/or 1080 may be adapted for various types of object detection methods for various objects.

As discussed, one component of an object definition may be trajectory information. Trajectory information may be utilized during object recognition and refinement processes and during searching and retrieval processes.

Figure 11A:
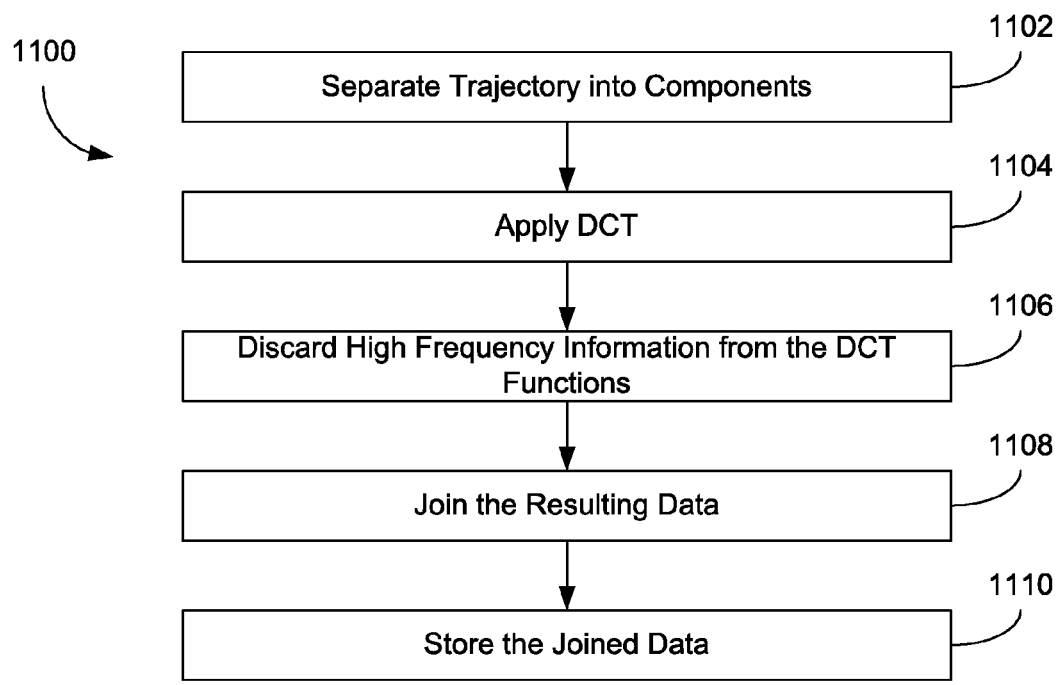
FIG. 11A is a flow diagram of a method of refining trajectory information, according to an exemplary embodiment.

Referring to FIG. 11A, a flow diagram of a method 1100 of refining trajectory information is shown, according to an exemplary embodiment. Also referring to FIG. 11B, components of object trajectory tracking are shown, according to an exemplary embodiment.

The trajectory may be separated into components (step 1102). A trajectory may be represented with two different pieces of information (e.g., an x distance over time and a y distance over time). According to other exemplary embodiments, trajectory may be represented differently (e.g., using a simple direction and speed vector). For example, in FIG. 11B, the trajectory 1152 of the vehicle is shown separated into an x distance over time and y distance over time in two plots 1154, 1156. When multiple items of trajectory information are tracked, trajectory histories may be decomposed further to allow trajectory matching based on two or more comparisons of a one-dimensional signal and to resolve any dimensional mismatch problems using time-series matching.

A DCT or another transformation may be applied to plots 1154, 1156 (step 1104). The results of the transformation are shown in plots 1158, 1160. Given a cosine transformed signal X, N number of coefficients may be obtained. Similarity computation between two signals may be defined as:

$$d(q,t) = \sqrt{\sum_{i=0}^{i<N} \left(\frac{t_i - q_i}{\sigma_i^2}\right)},$$

where q represents the query signal (e.g., trajectory 1152), t represents the target signal, and $\sigma_i$ represents a standard deviation over a respective dataset. The transformation smoothes out trajectory 1152 such that a modified trajectory (shown in plot 1162) may be obtained.

Plots 1158, 1160 may include data for high frequencies, which may be discarded from the DCT functions (step 1106). For example, all data points after a specific value of n in plots 1158, 1160 may be discarded.

The resulting data in plots 1158, 1160 may be joined (step 1108). The result is illustrated in plot 1162. The joined data may then be stored (step 1110).

Query System

Referring to FIG. 12, a block diagram of a video processing system 1200 used to detect, index, and store objects and events is shown, according to an exemplary embodiment. System 1200 may be an intelligent multimedia information system suitable for surveillance video recording that detects, indexes, and stores video objects and events for later retrieval.

An analog video encoding subsystem 1206 and digital video encoding subsystem 1214 may receive various inputs. For example, analog video encoding subsystem 1206 receives video from a camera 1202 via a processor 1204. Digital video encoding subsystem 1214 receives input from camera 1208 or 1210 via a receiver 1212 that communicates with cameras 1208 and 1210 either wirelessly or via a wired connection. Encoding subsystems 1206 and 1214 encode analog and/or digital video into a format (e.g., a universal format, a standardized format, etc.) that device independent video encoding control system 1216 is configured to receive and utilize.

Subsystems 1206 and 1214 provide an input (e.g., video) to device independent video encoding control subsystem 1216. Device independent video encoding control subsystem 1216 transcodes or otherwise processes the video frames into a device independent format. The video is passed to various systems and subsystems of system 1200 (e.g., video streaming subsystem 1218, surveillance video event and object detection system 1222, and recording subsystem 1226).

Video streaming subsystem 1218 is configured to stream video to viewing applications 1220 via a wired or wireless connection 1219. Viewing applications 1220 may retrieve compressed video from streaming subsystem 1218.

Surveillance video event and object detection system 1222 conducts a visual object and event extraction process. The visual object and event detection process may be similar to the systems and methods of FIGS. 3A-5B and may describe detected events (e.g., using a definition scheme such as an XML-based description scheme, etc.). The descriptions may be sent to index manager 1228 for indexing, storage, and retrieval.

System 1222 passes the descriptions to alarm and event management subsystem 1224. Alarm and event management subsystem 1224 contains rules or code to check for alarming and/or otherwise interesting behavior and events. For example, in a surveillance system that may retrieve video from the front of a building (e.g., airport), the alarm subsystem may produce an alarm if a large van approaches and is stopped for an extended period of time outside the front of the building. Alarm conditions may be reported to users and may also be sent to index manager 1228 for indexing and storing for later examination and retrieval.

Recording subsystem 1226 receives a video input from device independent video encoding control subsystem 1216. Recording subsystem 1226 may format the video as necessary and provide the video to short-term video storage and index database 1236 for future use. Recording subsystem 1226 records, compresses, or otherwise stores actual video.

Index manager 1228 indexes data provided by the various subsystems of system 1200. Index manager may provide data for any number of storage devices and system (e.g., search and retrieval subsystem 1230, archive subsystem 1234, short-term video storage and index 1236, and long-term video storage and index 1238).

Video may be stored in short-term video storage and index 1236 and/or long-term storage and index 1238. Short-term video storage and index 1236 may be used for temporary or intermediate storage during processing of the video or short-term storage may be high performance storage for allowing security personnel to quickly search or otherwise access recent events; the long-term storage and index 1238 taking slightly longer to access.

Archive subsystem 1234 receives information from index manager 1228, for example, to archive data that is not indexed as relating to any significant object or event. According to other exemplary embodiments, archive subsystem 1234 may be configured to archive descriptions of significant events so that even if the actual video information is deleted or corrupted, the rich description information remains available.

Search and retrieval subsystem 1230 receives information from index manager 1228. Subsystem 1230 is coupled to a search and retrieval interface 1232 which may be provided to a user of system 1200. The user may input any number of search and retrieval criteria using interface 1232, and search and retrieval subsystem 1230 searches for and retrieve video and other data based upon the user input. Interface 1232 may be a web interface, a java interface, a graphical user interface, and/or any other interface for querying for objects, events, timing, object types, faces, vehicles, and/or any other type of video.

Figure 13A:
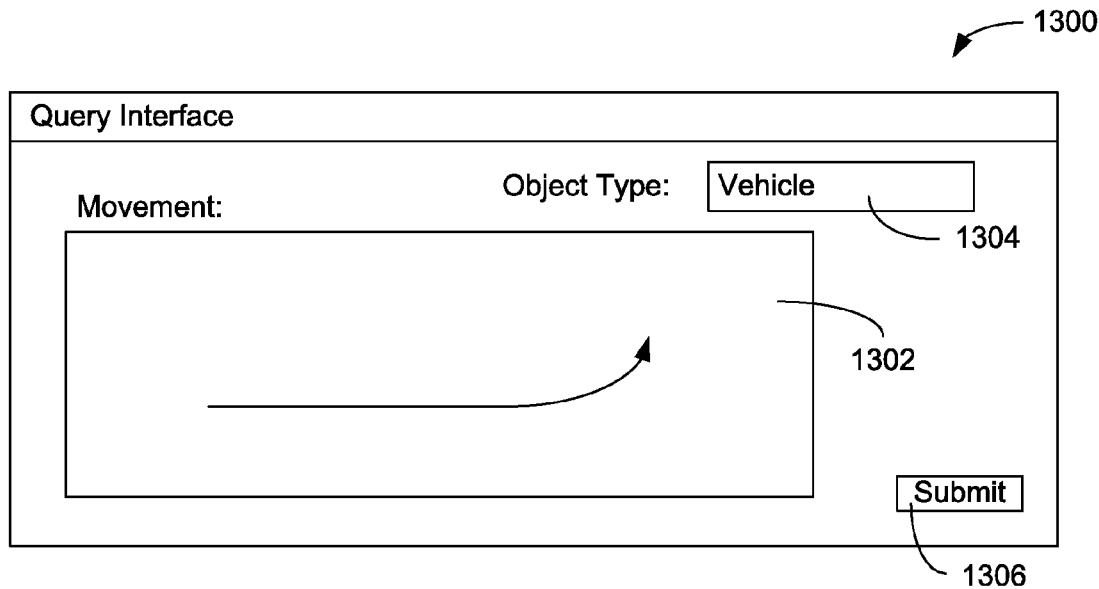
FIG. 13A is an exemplary user interface for conducting a visual query on video data, according to an exemplary embodiment.

Referring to FIG. 13A, an exemplary user interface 1300 for conducting a visual query on video data is shown, according to an exemplary embodiment. Using a trajectory based video event retrieval interface, a user is able to search for events rather than objects. This may be particularly useful when the shape, size, or color of objects may vary. Rather than iteratively searching for objects of different shapes and sizes, a user could form a query searching for any objects having a certain trajectory. In addition to trajectory querying, querying may be conducted by example, by visual similarity, by sketch, by keyword, and/or by any number of other query methods. An interface implementing querying by example, visual similarity, sketch, and/or trajectory may allow a user to "point and click" to create a visual query. This would allow users to create queries that may be difficult to describe via keyword.

In the user interface 1300 of FIG. 13A, two fields are shown (movement field 1302 and object type field 1304). Movement field 1302 may accept an input regarding a trajectory or path to be searched. The input may be any type of input (e.g., the user may "draw in" a path to search for, the user may use command words to describe a desired path to search for, etc.). Object type field 1304 may accept an input regarding a type of object to look for. According to various exemplary embodiments, field 1304 may provide a list of objects to select from, or field 1304 may allow a user to provide any description desired. The user may then submit the information provided using submit button 1306.

Figure 11B:
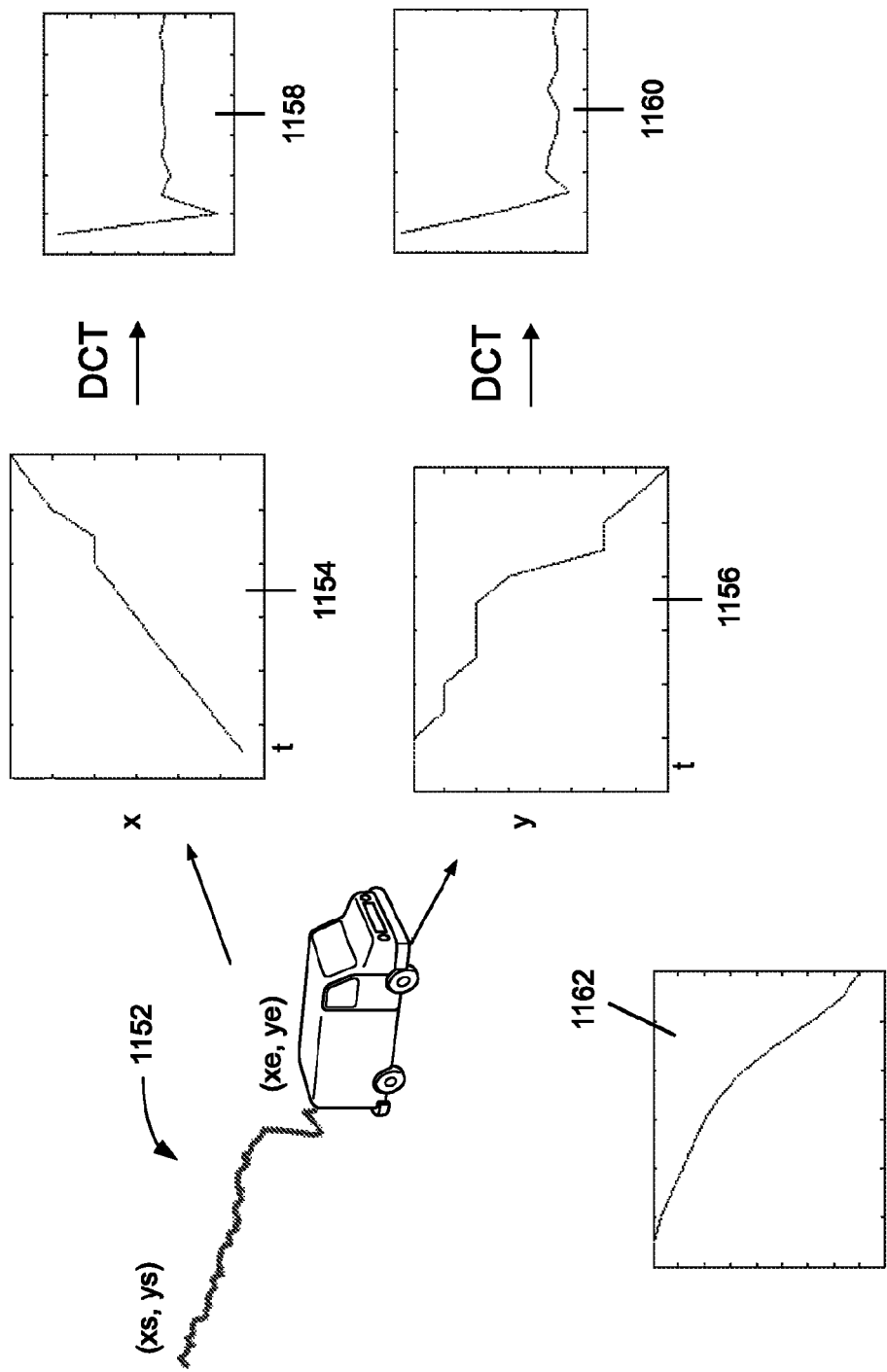
FIG. 11B illustrates components of object trajectory tracking, according to an exemplary embodiment.
Figure 13B:
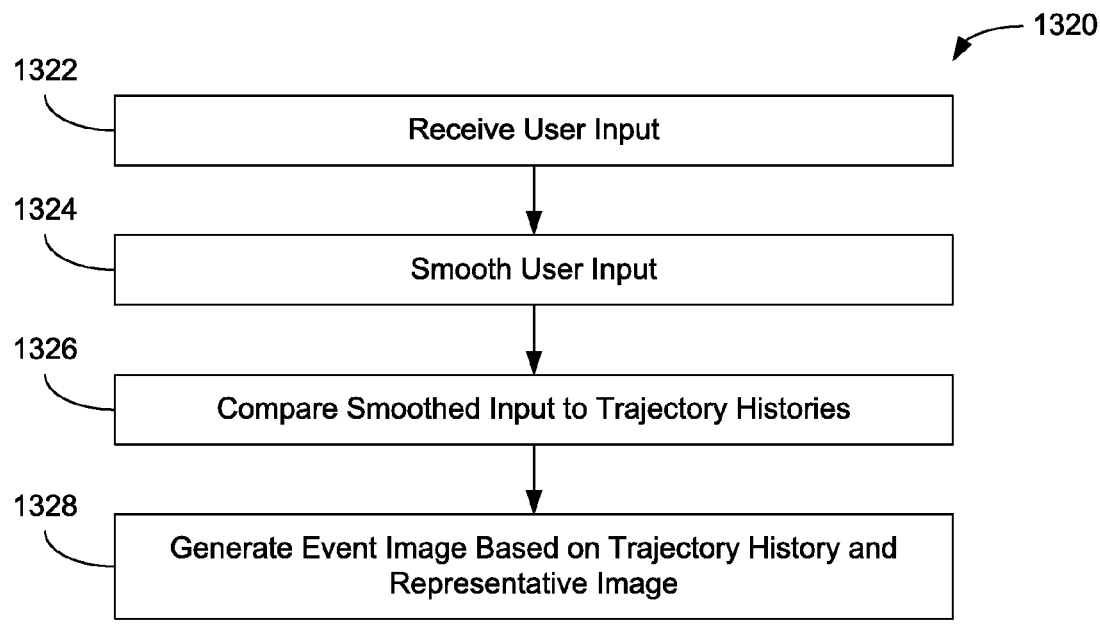
FIG. 13B is a flow chart for executing a visual query entered in FIG. 13A, according to an exemplary embodiment.

Referring to FIG. 13B, a flow diagram of a method 1320 of using a query to generate an event image is shown, according to an exemplary embodiment. A user input is received (step 1322). The input may be provided via user interface 1300 of FIG. 13A. The user input is smoothed (step 1324). According to one exemplary embodiment, the input is smoothed via the methods as illustrated in FIGS. 11A-B.

The smoothed input is compared to trajectory histories (step 1326). The input may be compared for all trajectory histories based on relevant frames as determined by method 1320. A exemplary trajectory history may be selected based upon if the trajectory history matches the user input to a certain degree.

Figure 13C:
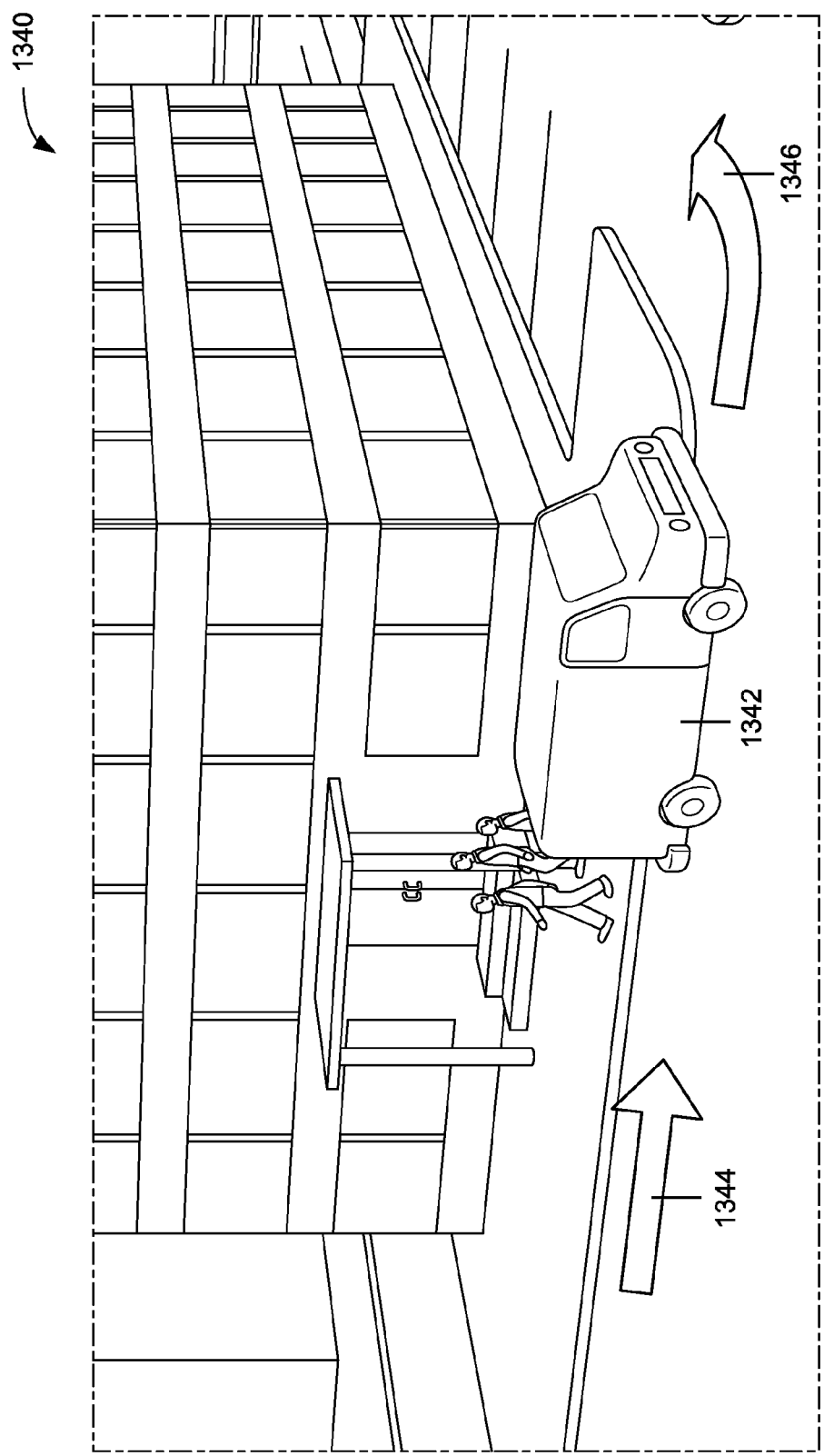
FIG. 13C illustrates of an exemplary output from the visual query system described with reference to FIGS. 13A and 13B, according to an exemplary embodiment.

An event image is generated based upon the trajectory history and representative image (step 1328). An example of an event image is illustrated in FIG. 13C. Event image 1340 may include a representative image 1342 to illustrate the location of the searched object. Event image 1340 may additionally include one or multiple trajectory indicators 1344, 1346 which indicate a general trajectory history of the searched object. Trajectory indicators 1344, 1346 generally outline the trajectory history and may closely resemble the user input (e.g., the sample user input as illustrated in field 1302 of FIG. 13A). Event image 1340 may additionally include various other details, and method 1320 may additionally provide object or trajectory details in a separate output, according to various exemplary embodiments.

In some cases, once an object has been identified, a user may not want to actually watch video of the object, but may just want to see a summary of how the object moved through a frame set. A video event icon may be generated for such a preference. To generate the icon, the system may begin with the frame that was used to extract the representative video object that was previously selected or created. The system then plots the trajectory of the object and superimposes a graphical representation of the trajectory onto the representative frame at appropriate locations. The video event icon may include various objects also contained within the frameset. All of the objects (e.g., background details, other moving objects, etc.) may be merged to create a visual world representation that attempt to convey a large amount of information through the single video event icon.

System for Providing Described Content to Clients

While some of the video processing activities shown and described in the present description may be conducted at a central processing server, it may be desirable to conduct some of the processing inside the cameras (e.g., embedded within the cameras) or on some other distributed basis (e.g., having different distributed processing systems conduct core processing tasks for different sets of cameras). Distributed processing may facilitate open platforms and third party extensions of video processing tasks while reducing hardware and software requirements of a central processing system. Using a distributed processing scheme, for example, video encoding, preprocessing, and object extraction may occur in a distributed manner. Then, for example, highly compressed or compressible information (e.g., text descriptions, meta data information, etc.) may be retrieved by other services (e.g., remote services) for analysis, playback, and/or storage. Such a distributed processing scheme may ease transfer and processing requirements of a network and/or server (e.g., processing bandwidth, network bandwidth, etc.).

Referring now to FIG. 14A, a block diagram of an exemplary video processing system 1400 is shown. Referring generally to FIG. 14A, video processing system 1400 is configured to provide video from a source 1402 to a client 1404 while processing the video and creating a content description or other data. Compressing and streaming the video may occur in parallel to the processing and content creation activity. According to various exemplary embodiments, video processing system 1400 advantageously reduces the bandwidth required to be used between the video server and the client server. Further, the configuration of processing system 1400 may advantageously reduce total processing time.

Video processing system 1400 is shown to include a capture filter 1406 that receives video from source 1402. Capture filter 1406 may conduct any of a variety of video processing or pre-processing activities (e.g., noise filtering, cropping, stabilizing, sharpening, etc.) on the video received from source 1402. In addition to capture filter 1406, filters 1408, 1410 and 1412 may be configured to conduct any additional and/or alternative filtering or preprocessing tasks.

Referring further to FIG. 14A, video processing system 1400 is shown to provide video information to processing branch 1414 in parallel with processing branch 1416, according to an exemplary embodiment. Processing branch 1414 is shown to include one or more video analysis modules (e.g., video analysis module 1418, video analysis module 1420, etc.). A plurality of video analysis modules may be configured to analyze received video information in parallel. According to various exemplary embodiments, more or fewer video analysis modules may be provided to system 1400 in any of a number of configurations (series, parallel, series and parallel, etc.). Video analysis modules of processing system 1400 may include computer code for conducting any number of video processing tasks. For example, video analysis module 1418 is shown to include a fire detector 1422 that may be or include computer code for detecting fire objects and/or events in the received video. Video analysis module 1420 is shown to include a people counter 1424 that may be or include computer code for counting people objects in the received video.

According to various other exemplary embodiments, video analysis module 1418 and/or video analysis module 1420 may be configured to conduct any type of video analysis. For example, a video analysis module of processing system 1400 may be configured to include object detection, behavior detection, object tracking, and/or computer code for conducting any of the video analysis activities described in the present application.

Filter 1410 may be specially configured to remove blocks or elements from the video that are known to not be fire-related. Filter 1412 may be specifically configured to remove blocks or elements from the video that are determined to not be people-related. Filters 1410, 1412, according to various other exemplary embodiments, may be of the same or different configurations.

Referring further to FIG. 14A, video analysis modules (e.g., 1418, 1420) output content descriptions based on the conducted analyses. Content description output from a video analysis module may take a variety of a forms. According to an exemplary embodiment, the content description takes the form of a structured language for describing the results and/or content of the processed video. The structured language may be, for example, a markup language (e.g., HTML, XML, SMIL, etc.). According to an exemplary embodiment, the content description conforms to a synchronized multimedia integration language (SMIL), an XML markup language for describing multimedia content. According to various other exemplary embodiments, any information structure or data description scheme may be generated and output by a video analysis module of system 1400. According to an exemplary embodiment, the content description may include more than one component. For example, a SMIL component may be used to describe detected objects, timing of events, tracking information, size information, and the like, while another component may describe different aspects of the video. According to an exemplary embodiment, a scalable vector graphics (SVG) component is generated and output from the video analysis module in addition to a SMIL component. SVG may be used to describe vector graphics relating to detected objects and/or events. Using SVG, for example, a client may be able to draw an outline around (or draw the edges of) detected video elements.

Data description schemes such as SMIL and SVG may be classified as data reduction schemes that allow video processing system 1400 to significantly reduce the size of the data passed between components (e.g., a server and a client) and/or stored. According to an exemplary embodiment, the content description accords to a standard specification. Using this configuration, system 1400 may advantageously provide for a video exchange mechanism that is rich in description, easy to index, easy to analyze, and for which it is easy to draft additional computer code (e.g., for storage and use in clients).

Referring still to FIG. 14A, as video is processed from multiple video analysis modules, the resulting content descriptions may be multiplexed by a content multiplexer 1426 to create a single content description (e.g., single content description file, database, etc.) for any given set of video information. The content description may then be provided to a video server 1428. Video server 1428 can be configured to receive requests from clients, conduct and/or coordinate communication tasks (e.g., establishing a secure connection via a connecting or "handshaking" process), to respond to the requests, to provide content description to the client, to provide video files to the client, and/or to provide a video stream to the client. The content description may be streamed with the video or the content description could be provided to the client prior to beginning the transfer and/or streaming of video to the client.

Referring still to FIG. 14A, processing branch 1416 is shown to include a video compressor 1430 and a video broadcaster 1432, according to an exemplary embodiment. Video compressor 1430 may be configured to compress received video into any number of lossless or lossy compression formats (e.g., MPEG 4). Video compressor 1430 may also be configured to encode the video stream with metadata information, security information, error checking information, error correction information, and/or any other type of information. Broadcaster 1432 may be configured to receive a compressed and/or encoded file or stream from compressor 1430. Broadcaster 1432 may further be configured to control the timing of streamed video. Broadcaster 1432 may also or alternatively be configured to use any number of streaming protocols to control the communication of the video stream to the video server 1428 and/or to the client 1404. According to an exemplary embodiment, broadcaster 1432 uses a protocol such as a real-time transfer protocol (RTP) and/or a protocol such as a real time streaming protocol (RTSP). Broadcaster 1432 and/or video server 1428 may be configured to synchronize the transmission of the content description (e.g., SMIL and SVG description) and the transmission of the associated streaming video (e.g., MPEG 4 over RTP/RTSP) or send the content description and the video asynchronously.

Referring to FIG. 14B, a flow diagram of a method 1450 of a distributed processing scheme is shown, according to an exemplary embodiment. Video information is provided to an encoding module (e.g., video compressor 1430 of FIG. 14A) from a source (step 1452). The encoding module encodes the video information with various types of information (e.g., metadata, security, error checking, error correction, etc.). The video information is provided to a first video analysis module (step 1454) and a second video analysis module (e.g., modules 1418 and 1420 of FIG. 14A) (step 1456). A first and second video content description is generated by each video analysis module (step 1458). The description is received by a multiplexer (e.g., context multiplexer 1426 of FIG. 14A), which multiplexes the first and second video content description (step 1460). The encoded video and multiplexed video content description is streamed (or otherwise provided) to a client (step 1462).

System for Enabling Remote/Distributed Processing of Video Information

Figure 15A:
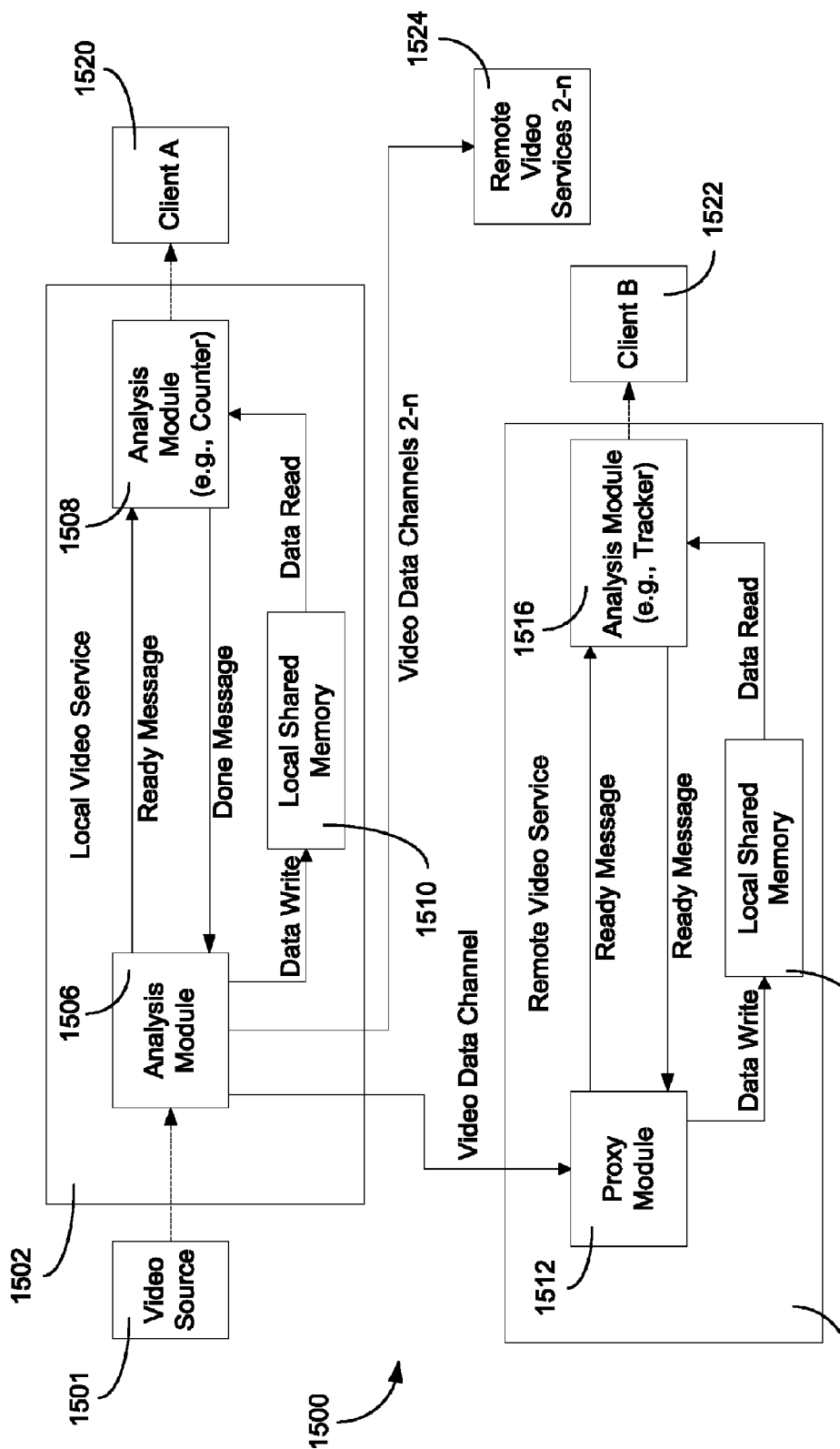
FIG. 15A is a block diagram of a system for enabling the remote and/or distributed processing of video information, according to an exemplary embodiment.

Referring now to FIG. 15A, a block diagram of a system 1500 for enabling the remote and/or distributed processing of video information is shown, according to an exemplary embodiment. System 1500 is generally configured to provide video information from a video source 1501 to a first video service (e.g., local video service 1502). The first video service is configured to provide analyzed video to a client 1520 and/or to a second video service (e.g., remote video service 1504). System 1500 advantageously allows remote video service 1504 to receive information that has already been processed at least once. When the processing that has already occurred can exist independently of the original video stream, the data provided from the first video service to the second video service can be significantly reduced in size. Accordingly, the first video service may provide an increased number of video channels to remote video services and/or clients when compared to typical video services.

Referring further to FIG. 15A, local video service 1502 is shown to include an analysis module 1506. Analysis module 1506 may analyze video to extract objects, to remove background information, and/or to conduct any number of additional or alternative video processing tasks. According to an exemplary embodiment, analysis module 1506 conducts basic object extraction and may extract a number of objects and associated bounding rectangles from received video information. Upon completion of the analysis (e.g., a frame, a group of frames, etc.), analysis module 1506 is configured to send a ready message to second analysis module 1508. Analysis module 1506 is shown to store the results output from analysis module 1506 into memory (e.g., local shared memory 1510).

Upon receipt of the ready message from analysis module 1506, second analysis module 1508 reads the data from memory 1510. Second analysis module 1508 may be configured to conduct additional and/or complementary processing tasks on the processed data. For example, second analysis module 1508 may be configured to count the number of vehicle objects in the processed data. Results from second analysis module 1508 may be placed in memory 1510, transferred to a client 1520, transferred to another analysis module, or otherwise. According to an exemplary embodiment, memory device 1510 (or a module controlling memory device 1510) is configured to delete video data once the data is no longer needed by an analysis module. Second analysis module 1508 may send a done message back to analysis module 1506 when analysis module 1508 has completed analysis, indicating that second analysis module 1508 is ready to process another set of data.

According to various exemplary embodiments a master-control process or another module of the system manages the flow of data from analysis module 1506 to memory and/or the flow of messages between the first analysis module and the second analysis module.

Referring still to FIG. 15A, local video service 1502 is shown to be configured to provide data results from analysis module 1506 to remote video service 1504, according to an exemplary embodiment. Local video service 1502 may also provide data results from analysis module 1506 to any number of remote video services 1524. Proxy agent 1512 is configured to receive the data results from analysis module 1506 and to place the received data in memory 1514 of remote video service 1504. An analysis module 1516 of remote video service 1504 may be configured to conduct further processing on the video data using the same or a different messaging protocol as local video service 1502. Results from analysis module 1516 may be placed in memory 1514, transferred to a client 1522, or otherwise.

According to an exemplary embodiment, system 1500 may utilize a data exchange mechanism such as that shown in FIGS. 14A and 14B.

Figure 15B:
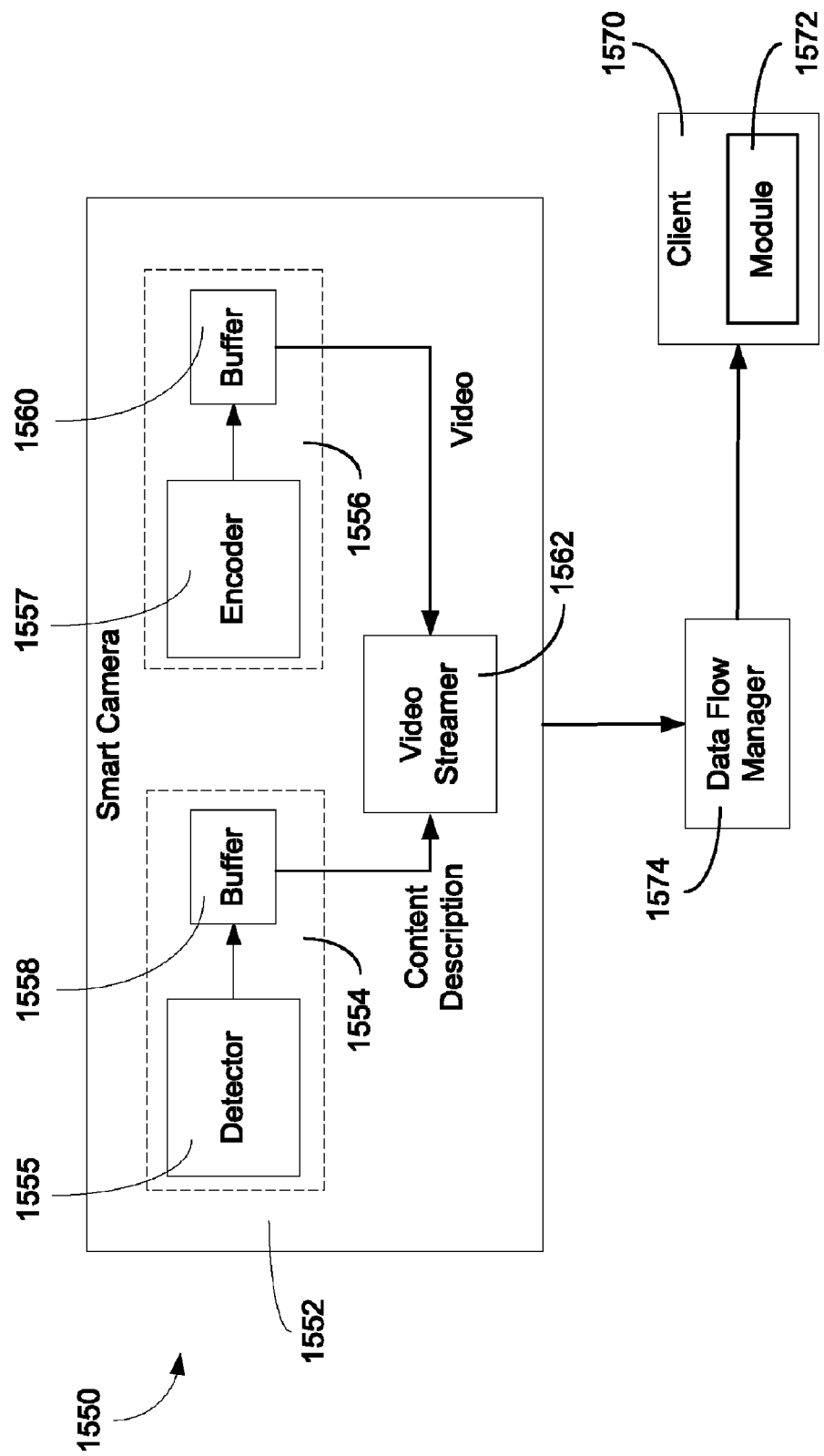
FIG. 15B is a block diagram of a system implementing the systems of FIGS. 14A and 15A, according to an exemplary embodiment.

Referring now to FIG. 15B, a system 1550 implementing the systems of FIGS. 14A and 15A is shown. Smart camera 1552 includes first processing branch 1554 for encoding (using detector 1555) and passing video and second processing branch 1556 for analyzing video (using encoder 1557) and passing description information. Branch 1554 and branch 1556 each use a buffer (buffers 1558 and 1560). Video streamer 1562 accesses the video and the description information from buffers 1558 and 1560 for providing the information to a client 1570. A module 1572 (e.g., proxy module, analysis module, etc.) of client 1570 may request to sign-up with smart camera 1552 and module 1572 may send a granted message to client 1570. Once smart camera 1552 grants access, camera 1552 may begin streaming video and/or data information to module 1572. In this example, smart camera 1552 conducts both video encoding and a first level of object extraction. Further object extraction and/or tracking may be accomplished in client 1570.

Data flow manager 1574 is shown between camera 1152 and client 1570. Data flow manager 1574 is used to compensate for processing differences between camera 1152 and client 1570. For example, camera 1152 may provide images at 30 frames per second (FPS) while client 1570 may process images at the rate of 5 FPS. Skipper 1574 receives data from camera 1152 and stores some of the data (e.g., in a database, a queue, etc.). Data flow manager 1574 may provide only some of the data received from camera 1152 to client 1570 such that client 1570 may process the received data without "falling behind". Client 1570 may access the database or queue of data not provided if needed.

While the exemplary embodiments illustrated in the figures and described herein are presently preferred, it should be understood that the embodiments are offered by way of example only. Accordingly, the present application is not limited to a particular embodiment, but extends to various modifications that nevertheless fall within the scope of the appended claims.

The present disclosure contemplates methods, systems, and program products on any machine-readable media for accomplishing various operations. The embodiments of the present application may be implemented using existing computer processors, or by a special purpose computer processor for an appropriate system, incorporated for this or another purpose, or by a hardwired system.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for processing video information obtained by a video camera based on a representative view from the camera, the system comprising:
   a processor; and
   a memory communicably connected to the processor, the memory comprising:
      computer code for determining a relative depth for at least two different regions of the representative view, the two different regions comprising a near field region and a far field region;

computer code for estimating a scale factor for the different regions of the representative view;

computer code for determining a unit size for dividing the different regions into units of the determined unit size, the unit size based on the estimated scale factor and the determined relative depth of the different regions, wherein the unit size for the far field region is selected so that there are at least twice as many units in the far field region as the number of units in the near field region and the unit size for the far field is at most half that of the unit size for the near field region;

computer code for obtaining a new video frame of the same area captured by the representative view such that the regions, unit size, scale factor, and relative depth for the different regions are retained;

computer code for processing the regions for objects in a divided manner and on a unit-by-unit basis for each of the different regions such that less processing time is spent processing the units of the near field region than the units of the far field region.

2. The system of claim 1, wherein the computer code for processing identifies an object in each unit that meets at least one of the following criteria: (1) the object is not a part of a background known for the video scene; (2) the object is moving between frames of the video scene in a significant way; (3) the dominant color of the object fills or nearly fills the unit.

3. The system of claim 2, wherein the object is at least one of a person, a face, and a vehicle.

4. The system of claim 1, wherein the scale factor relates a video size to a physical size.

5. The system of claim 1, wherein the memory further comprises computer code for storing the determined unit size for the different regions.

6. The system of claim 1, wherein the memory further comprises computer code for storing at least one of the estimated scale factor and the determined relative depth of the different regions.

7. The system of claim 1, wherein the memory further comprises:

computer code for generating a graphical user interface configured to accept user input, wherein the relative depth of the different regions of the representative view is determined based on the user input.

8. The system of claim 7, wherein the graphical user interface comprises:

an image of the representative view; and a grid shown over the image.

9. The system of claim 8, wherein the memory further comprises:

computer code for allowing the user to manipulate the shape of the grid to match perspective features of the representative view.

10. The system of claim 1, further comprising:

computer code for transforming an object identified in the far field so that the object approximates the size that the object would be in the near field.

11. The system of claim 10, further comprising:

computer code for defining a cylinder sized to approximate the size of the object;

computer code for relating a number of people to the object based on the cylinder definition.

* * * * *